US 10,404,436 B2
*Sep. 3, 2019

(12) United States Patent
Niwano

(10) Patent No.: US 10,404,436 B2
(45) Date of Patent: *Sep. 3, 2019

(54) MOBILE STATION, BASE STATION, COMMUNICATIONS SYSTEM, AND COMMUNICATIONS METHOD

(71) Applicant: Mitsubishi Electric Corporation, Chiyoda-ku (JP)

(72) Inventor: Kazuhito Niwano, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,522

(22) Filed: Jan. 23, 2014

(65) Prior Publication Data
US 2014/0133468 A1 May 15, 2014

Related U.S. Application Data

(62) Division of application No. 13/368,048, filed on Feb. 7, 2012, now Pat. No. 8,675,546, which is a division
(Continued)

(51) Int. Cl.
*H04L 5/00* (2006.01)
*H04W 72/04* (2009.01)
(Continued)

(52) U.S. Cl.
CPC ....... *H04L 5/0053* (2013.01); *H04W 72/1268* (2013.01); *H04W 8/20* (2013.01); *H04W 28/065* (2013.01)

(58) Field of Classification Search
CPC .............. H04L 5/0053; H04W 28/065; H04W 72/1268
(Continued)

(56) References Cited

U.S. PATENT DOCUMENTS 6,359,895 B1 3/2002 Yamanaka
6,532,225 B1 * 3/2003 Chang ................... H04W 76/10
370/341
(Continued)

FOREIGN PATENT DOCUMENTS

CN 1375950 A 10/2002
CN 1385050 A 12/2002
(Continued)

OTHER PUBLICATIONS

Online: "AH64: Reducng Control Channel Overhead for Enhanced Uplink", 3GPPRAN1#30, 2003.
(Continued)

*Primary Examiner* — Qun Shen
(74) *Attorney, Agent, or Firm* — Oblon, McClelland, Maier & Neustadt, L.L.P.

(57) ABSTRACT

A mobile station includes a radio link control unit for outputting or inputting data that are transmitted or received via a radio channel to or from a higher-level protocol layer, a media access control unit for outputting or inputting the data via a logical channel to or from the radio link control unit, a physical layer control unit for outputting or inputting the data via a transport channel to or from the media access control unit, and for controlling radio communications, and a radio resource control unit for outputting or inputting control data to or from the radio link control unit, media access control unit, and physical layer control unit. The mobile station multiplexes report information therefrom into a channel for packet data transmission so as to transmit it to a base station. The base station carries out assignment of radio resources using the report information.

12 Claims, 23 Drawing Sheets

Related U.S. Application Data of application No. 11/574,518, filed as application No. PCT/JP2004/013057 on Sep. 8, 2004, now Pat. No. 8,149,765.

(51) Int. Cl.
  *H04W 72/12* (2009.01)
  *H04W 8/20* (2009.01)
  *H04W 28/06* (2009.01)

(58) Field of Classification Search
  USPC .................................. 370/335, 329; 455/436
  See application file for complete search history.

(56) References Cited

U.S. PATENT DOCUMENTS

| | | | |
|---|---|---|---|
| 6,611,688 B1* | 8/2003 | Raith | H04W 4/02 340/992 |
| 6,694,135 B1 | 2/2004 | Oksala et al. | |
| 6,826,193 B1* | 11/2004 | Peisa | 370/437 |
| 7,158,504 B2* | 1/2007 | Kadaba et al. | 370/348 |
| 7,539,207 B2 | 5/2009 | Frederiksen et al. | |
| 7,599,698 B2* | 10/2009 | Cheng | H04W 8/24 455/450 |
| 8,040,833 B2 | 10/2011 | Choi | |
| 2002/0055360 A1 | 5/2002 | Chen et al. | |
| 2003/0123409 A1 | 7/2003 | Kwak et al. | |
| 2003/0147348 A1* | 8/2003 | Jiang | 370/229 |
| 2003/0185193 A1* | 10/2003 | Choi | H04L 29/06 370/348 |
| 2003/0193913 A1* | 10/2003 | Murata | H04L 1/0006 370/332 |
| 2004/0019808 A1 | 1/2004 | Devine et al. | |
| 2004/0160919 A1* | 8/2004 | Balachandran et al. | 370/335 |
| 2005/0075112 A1* | 4/2005 | Ball | H04W 64/00 455/456.1 |
| 2005/0136919 A1 | 6/2005 | Park et al. | |
| 2006/0013182 A1 | 1/2006 | Balasubramanian et al. | |
| 2006/0198325 A1 | 9/2006 | Gao et al. | |
| 2007/0165667 A1 | 7/2007 | Kadaba et al. | |

FOREIGN PATENT DOCUMENTS

| | | |
|---|---|---|
| GB | 2 355 890 A | 5/2001 |
| JP | 64 042951 | 2/1989 |
| JP | 2002 369261 | 12/2002 |
| JP | 2002 374321 | 12/2002 |
| JP | 2003 46482 | 2/2003 |
| JP | 2003 512791 | 4/2003 |
| JP | 2003 513535 | 4/2003 |
| JP | 2003 283507 | 10/2003 |

OTHER PUBLICATIONS

Online: "3$^{RD}$ Generation Partnership Project; Technical Specification Group Radio Access Network; Feasibility Study OFR Enhanced Uplink for UTRA FDD", 3 GPP TR 25.896 V6.0.0, pp. 1-179, 2004.
Online: "Uplink Signalling of Scheduling Information", 3 GPP TSG-RAN WG1 #34 Meeting, 2003.
Tdoc R1-031056, 3GPP TSG-RAN WG1 #34 Meeting, by Samsung, Seoul, Korea, Oct. 6-10, 2003.
Chinese Office Action dated Jan. 3, 2018 in Chinese Patent Application No. 201410403136.7 (with English translation).
Official Action dated Jan. 4, 2018 in corresponding European Patent Application No. 13 169 611.4.
Office Action dated May 29, 2018 in Chinese Application No. 201410403136.7.
Office Action dated Mar. 29, 2018 in Chinese Patent Application No. 201410403243.X with English translation obtained from the Google Translation System, citing document AO therein, 20 pages.
Office Action dated Feb. 26, 2018 in European Patent Application No. 04 787 740.2 citing document AP therein, 3 pages.
Chinese Office Action dated Sep. 7, 2017 in corresponding Chinese Patent Application No. 201410403136.7 with machine generated English translation, 22 pages.
Office Action dated Nov. 30, 2017 in Chinese Patent Application No. 2014 1040 3243.X. (with English translation) 25 pages.
Office Action dated Oct. 8, 2016 in corresponding Chinese Application No. 201210178008.8, with English Translation.
Chinese Office Action dated Jul. 27, 2018 in Chinese Patent Application No. 201410403243.X (with unedited computer generated English translation), 21 pages.
Office Action dated Dec. 28, 2018 in Chinese Application No. 201410403136.7 (w/compute-generated English translation).
Office Action dated Feb. 20, 2019 in Chinese Application No. 201410403243.X (w/English translation).
Office Action dated Apr. 28, 2019 in Chinese Application No. 201410403136.7 (w/computer-generated English translation).
Office Action dated Chinese Application No. 201410403243.X (w/computer-generated English translation).

* cited by examiner

| D/C | PDU Type | $D_1$ | | Oct1 |
|---|---|---|---|---|
| | $D_1$ | | | Oct2 |
| | ----- | | | |
| | $D_N$ | | | |
| | Padding(opt) | | | OctN |

(b)

| Bit | PDU Type |
|---|---|
| 000 | STATUS |
| 001 | RESET |
| 010 | RESET ACK |
| 011 | MAC-e STATUS |
| 100-111 | Reserved(PDUs with this coding will be discarded by this version of the protocol). |

FIG.19
(a)
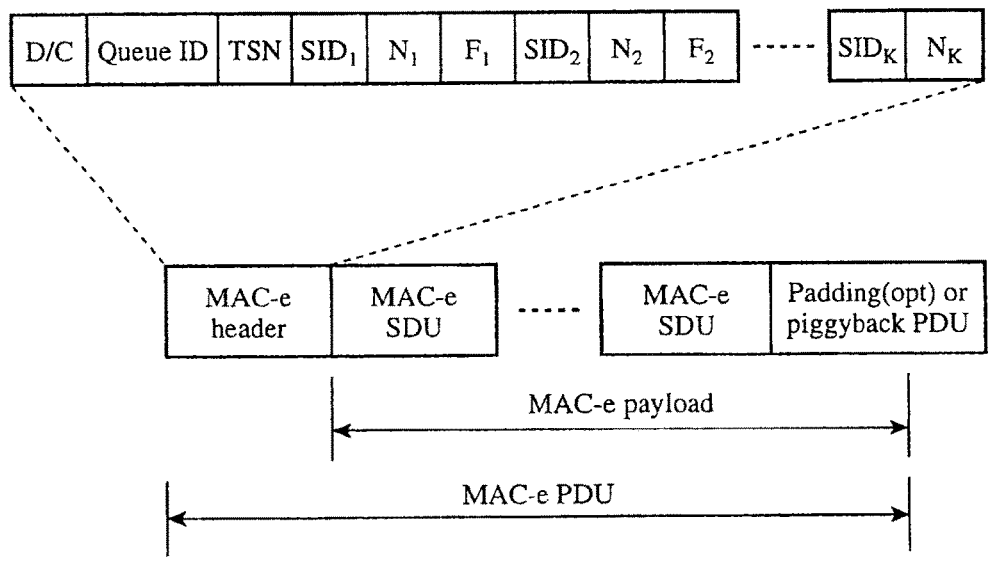
(b)
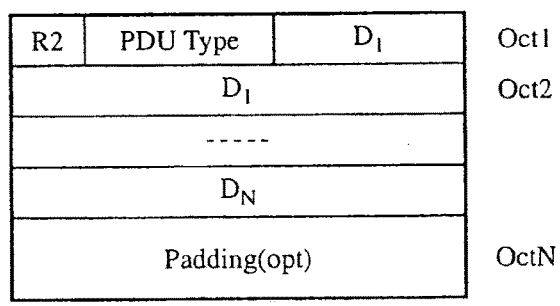

MOBILE STATION, BASE STATION, COMMUNICATIONS SYSTEM, AND COMMUNICATIONS METHOD

CROSS-REFERENCE TO RELATED APPLICATIONS

This application is a divisional of and is based upon and claims the benefit of priority under 35 U.S.C. § 120 for U.S. Ser. No. 13/368,048 filed Feb. 7, 2012 which is a divisional of U.S. Ser. No. 11/574,518, filed Mar. 1, 2007 (now U.S. Pat. No. 8,149,765) which is the national stage of PCT/JP04/13057 filed Sep. 8, 2004. The entire contents of each of which are incorporated herein by reference.

FIELD OF THE INVENTION

The present invention relates to a mobile station and a base station which communicate packet data with each other in a CDMA (Code Division Multiple Access) mobile communications system, a communications system which communicates packet data, and a communications method of communicating packet data in a CDMA mobile communications system.

BACKGROUND OF THE INVENTION

As a high-speed mobile communications system which adopts a CDMA method, the telecommunications standard called the third generation and referred to as IMT-2000 is adopted by the International Telecommunications Union (ITU). Commercial services based on W-CDMA (FDD: Frequency Division Duplex) technology were started in Japan in 2001. A W-CDMA (FDD) system is a third-generation mobile communications system, and aims at acquiring a transmission rate of up to about 2 Mbps per mobile station. For W-CDMA (FDD) systems, the first specifications were determined in the 1999 released edition which the standardization organization 3GPP (3rd. Generation Partnership Project) summarized in 1999.

Currently, release 4 and release 5 are defined as other new versions of release 1999, and release 6 is being generated.

In the above-mentioned standards, it is assumed originally that a service which offers continuous data like voice data is provided. For this reason, even when carrying out burst transmission such as transmission of packets from a mobile station to a base station, a dedicated channel DCH (Dedicated CHannel) is always ensured, as a radio resource, for each mobile station. This presents a problem from the viewpoint that effective use of radio resources is needed as the use of packet data increases in recent years because of the proliferation of the Internet.

Furthermore, since transmission of data from a mobile station is carried out through autonomous transmission control (Autonomous Transmission) by the mobile station, the timing of transmission by each mobile station is arbitrary or random. Therefore, in a CDMA communications system, since transmission from other mobile stations all serves as a source of interference, a base station can only predict the amount of interference noise at a time of receiving data from each mobile station and the amount of variations in the interference noise amount statistically. Therefore, in the management of radio resources, it is necessary to suppress the throughput and the mobile station maximum transmission rate by assuming a case in which the amount of variations in the interference noise is large, and to carry out control of assignment of radio resources to ensure margins.

Actually, the radio resource management for mobile station transmission (for uplink), which is defined by the W-CDMA standard, is not carried out by a base station itself, but is carried out by a base station control apparatus (RNC: Radio Network Controller) which organizes a plurality of base stations. Hereafter, a combination of a base station and a base station control apparatus will be referred to as a base station side. It takes a relatively long process time of about several hundred msec for a base station control apparatus (RNC) to perform each of management of radio resources on a mobile station and an exchange of management information with the mobile station. For this reason, a problem with a base station control apparatus is that it cannot carry out high-speed control of assignment of radio resources while monitoring a high-speed change in the radio propagation environment, the amount of interference from other mobile stations, etc.

Nonpatent reference 1 proposes an on-demand channel assignment method for uplink as a technology for providing enhancement of uplink performance/expansion of functions on the basis of the above-mentioned current standards (releases 1999, 4 and 5).

According to FIG. 1 of nonpatent reference 1, a mobile station (UE: User Equipment) with packets to be transmitted notifies information (Queue size) about the amount of data of yet-to-be-transmitted packets and mobile station transmit power margin information (Power Margin), as a packet data transmission request, to a base station (NodeB) via a channel for transmission request (USICCH: Uplink Scheduling Information Control Channel). The base station which has received this request notifies a radio resource assignment result (or a scheduling result), such as a transmission timing, to the mobile station via a downlink assignment control channel (DSACCH: Downlink Scheduling Assignment Control Channel). The mobile station transmits packet data to the base station via a channel for data transmission (EUDCH: Enhanced Uplink Dedicated Transport Channel) according to the received scheduling result. The mobile station transmits information, including information about a modulation method at the time of the transmission of packet data to the base station, to the base station via a type-of-modulation information channel (UTCCH: Uplink TFRI Control Channel) separately. The base station judges whether it has received the packet data correctly, and notifies ACK/NACK indicating the judgment result to the mobile station via a channel for notification (DANCCH: Downlink Ack/Nack Control Channel). Although it can be assumed that these channels are an extension of conventional standard channels or new channels which are introduced into the system, the details of the channels have not been proposed yet.

Nonpatent reference 2 proposes a technology generated on the basis of nonpatent reference 1.

As conventional examples of a technology for notifying information on the amount of data to be transmitted from a mobile station to a base station, there are a packet communication method, as disclosed by patent reference 1, of a mobile station notifying the amount of data to be transmitted in response to polling from a base station, a packet transmission method, as disclosed by patent reference 2, of a mobile station notifying the size of packets to be transmitted to a base station, and the base station assigning radio resources on the basis of the packet size notified thereto, and a method, as disclosed by patent reference 3, of a base station assigning radio resources on the basis of available transmission power, the amount of transmission data, QoS, or the like notified from a mobile station.

However, patent references 1 to 3, and nonpatent references 1 and 2 do not disclose any concrete method about the format of information on transmission data at the time of transmission of the information on transmission data.

According to the conventional W-CDMA standard, when information about the amount of yet-to-be-transmitted data transmitted from a mobile station is temporarily received by a base station, the information about the amount of yet-to-be-transmitted data is notified to a base station control apparatus (RNC) juts as it is. For this reason, the base station cannot grasp the contents of the information about the amount of yet-to-be-transmitted data. Therefore, the base station cannot implement such uplink radio resource control as disclosed in patent references 1 to 3 and nonpatent references 1 and 2. Furthermore, according to the conventional W-CDMA standard, there is provided no means for notifying the information about the amount of yet-to-be-transmitted data of a mobile station from a base station control apparatus to a base station (NodeB). Even if it is possible to provide a means of temporarily sending information which the base station control apparatus has acquired to the base station, because the transmission period of the amount information of yet-to-be-transmitted data from the mobile station to the base station control apparatus is set to a long time period such as 250 ms, 500 ms, . . . , or 6,000 ms, there is a problem that the base station cannot perform high-speed radio resource control.

Nonpatent reference 3 proposes a technology about the notification timing of mobile station information, including amount-of-data information about the amount of yet-to-be-transmitted data, and a transmit power margin, which is related to the on-demand channel assignment method disclosed by nonpatent reference 1. In nonpatent reference 3, various transmission methods, such as a periodic transmission method, are shown.

However, only a proposal about the notification timing is disclosed by nonpatent reference 3, and no concrete method about the format of notification, transmit channel specification, etc. at the time of transmission of packets is disclosed by nonpatent reference 3.

Nonpatent reference 2 further discloses, as another on-demand channel assignment method, a method of reporting, as a packet data transmission request, not the above-mentioned amount of yet-to-be-transmitted packet data of the mobile station, but a transmission rate (Rate Request) which the mobile station desires to the base station via an uplink channel (Rate control scheduling). The base station carries out scheduling on the basis of the transmission transfer rate request from each mobile station in the cell, and, after that, notifies, as a scheduling result, a grant transmission transfer rate (Rate Grant) to each mobile station via a downlink channel. However, nonpatent reference 2 discloses no concrete method about the format of request, transmit channel specification, etc. at the time of transmission of packet data, like nonpatent reference 1.

The present invention is made in order to solve the above-mentioned problems, and it is therefore an object of the present invention to provide a mobile station, a base station, a communications system, and a communications method which are suitable for a case in which report information from a mobile station which is needed for radio resource control for uplinks in a base station is notified from the mobile station directly to the base station at a high speed.
[Patent reference 1] JP,64-42951,A
[Patent reference 2] JP,2002-374321,A
[Patent reference 3] JP,2003-46482,A

[Nonpatent reference 1] "AH64: Reducing control channel overhead for Enhanced Uplink", [online], Jan. 7-11, 2003, 3GPPRAN1#30, and [retrieved on Jan. 7, 2004], the Internet <URL:http://www.3gpp.org/ftp/tsg_ran/WG1_RL1/TSGR1_30/Docs/Zips/R1-030067.zip>
[Nonpatent reference 2] "3rd Generation Partnership Project; Technical Specification Group Radio Access Network; Feasibility Study for Enhanced Uplink for UTRA FDD" (Release 6), [online], 2004-3, TR25.896v6.0.0, [retrieved on May 10, 2004], the Internet <URL:http://www.3gpp.org/ftp/Specs/2004-03/Rel-6/25_series/25896-600.zip>
[Nonpatent reference 3] "Uplink signaling of scheduling information", [online], [retrieved on Jan. 7, 2004], the Internet <URL:http://www.3gpp.org/ftp/tsg_ran/WG1_RL1/TSGR1_34/Docs/Zips/R1-031056.zip>

DISCLOSURE OF THE INVENTION

In accordance with the present invention, there is provided a mobile station provided with a radio link control unit for outputting or inputting data which are transmitted to or received from a base station via a radio channel to or from a higher-level protocol layer, a media access control unit for outputting or inputting the data via a logical channel to or from the radio link control unit, a physical layer control unit for outputting or inputting the data via a transport channel to or from the media access control unit, and for controlling radio communications with the base station, and a radio resource control unit for outputting or inputting control data to or from the radio link control unit, the media access control unit, and the physical layer control unit, in which the media access control unit multiplexes report information to be transmitted to the base station into a channel for packet data transmission so as to transmit the report information to the base station.

As a result, because uplink radio resource control can be carried out in the base station and higher-speed control can be carried out as compared with radio resource control by a base station control apparatus, the efficiency of a communications system is further improved and the throughput of the whole cell is improved.

In accordance with the present invention, there is provided a base station provided with a radio link control unit for outputting or inputting data which are transmitted to or received from a mobile station via a radio channel to or from a higher-level protocol layer, a media access control unit for outputting or inputting the data via a logical channel to or from the radio link control unit, a physical layer control unit for outputting or inputting the data via a transport channel to or from the media access control unit, and for controlling radio communications with the mobile station, and a radio resource control unit for outputting or inputting control data to or from the radio link control unit, the media access control unit, and the physical layer control unit, characterized in that the media access control unit carries out assignment of radio resources using report information which is multiplexed into data transmitted via a channel for packet data transmission from the mobile station.

As a result, because uplink radio resource control can be carried out in the base station and higher-speed control can be carried out as compared with radio resource control by a base station control apparatus, the efficiency of a communications system is further improved and the throughput of the whole cell is improved.

In accordance with the present invention, there is provided a communications system provided with a mobile station and a base station, the mobile station including a radio link control unit for outputting or inputting data which are transmitted or received via a radio channel to or from a higher-level protocol layer, a media access control unit for outputting or inputting the data via a logical channel to or from the radio link control unit, a physical layer control unit for outputting or inputting the data via a transport channel to or from the media access control unit, and for controlling radio communications, and a radio resource control unit for outputting or inputting control data to or from the radio link control unit, the media access control unit, and the physical layer control unit, characterized in that the mobile station multiplexes report information from the mobile station into a channel for packet data transmission so as to transmit the report information to the base station, and the base station carries out assignment of radio resources using the report information from the mobile station.

As a result, because uplink radio resource control can be carried out in the base station and higher-speed control can be carried out as compared with radio resource control by a base station control apparatus, the efficiency of the communications system is further improved and the throughput of the whole cell is improved.

In accordance with the present invention, there is provided a communications method comprising the steps of: a mobile station multiplexing report information therefrom into a channel for packet data transmission so as to transmit the report information to a base station, the mobile station including a radio link control unit for outputting or inputting data which are transmitted to or received from the base station via a radio channel to or from a higher-level protocol layer, a media access control unit for outputting or inputting the data via a logical channel to or from the radio link control unit, a physical layer control unit for outputting or inputting the data via a transport channel to or from the media access control unit, and for controlling radio communications with the base station, and a radio resource control unit for outputting or inputting control data to or from the radio link control unit, the media access control unit, and the physical layer control unit; and the base station carrying out assignment of radio resources using the report information which it receives from the mobile station.

As a result, because uplink radio resource control can be carried out in the base station and higher-speed control can be carried out as compared with radio resource control by a base station control apparatus, the efficiency of the communications system is further improved and the throughput of the whole cell is improved.

BRIEF DESCRIPTION OF THE FIGURES

FIG. 18 is a diagram showing the format of MAC-e PDU in accordance with embodiment 4 of the present invention;

FIG. 19 is a diagram showing the format of MAC-e PDU in accordance with embodiment 5 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
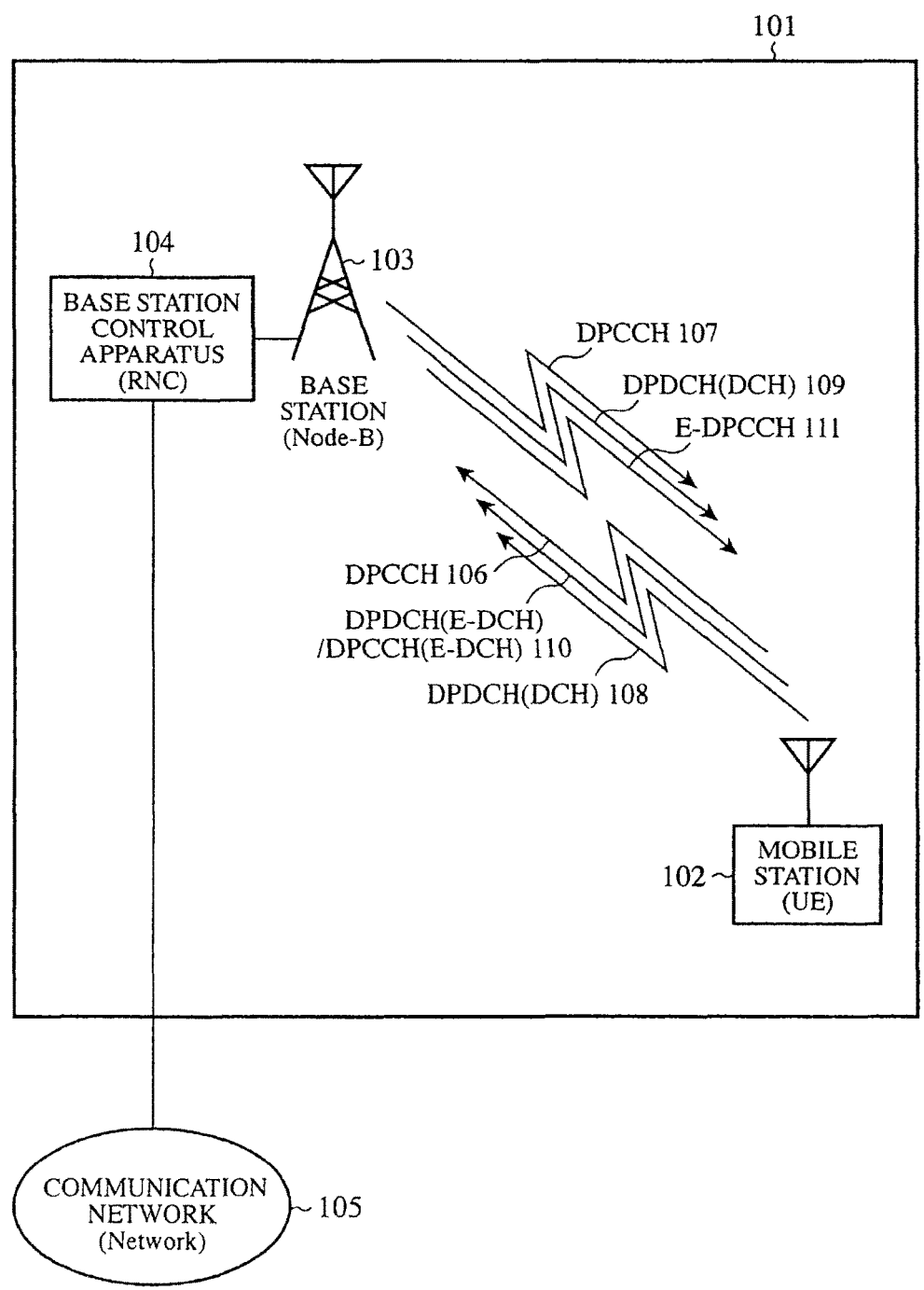
FIG. 1 is a block diagram showing the structure of a communications system in accordance with embodiment 1 of the present invention.

FIG. 1 is a block diagram showing a communications system 101 in accordance with embodiment 1 of the present invention.

As shown in the figure, the communications system 101 is provided with a mobile station 102, a base station 103, and a base station control apparatus 104. The base station 103 communicates with two or more mobile stations 102 staying in a fixed range thereof. This communication range of this base station 103 is called a sector or cell. Only one mobile station 102 is shown in the figure.

The base station control apparatus 104 is connected to an external communication network 105, such as a public telephone network or the Internet, and relays packet communications between the base station 103 and the communication network 105.

In the W-CDMA standard, the mobile station 102 is called UE (User Equipment), the base station 103 is called Node-B, and the base station control apparatus 104 is called RNC (Radio Network Controller).

The mobile station 102 and base station 103 communicate with each other using a plurality of radio links (or channels).

Physical control channels (Physical Control Channel) include a DPCCH 106 (Dedicated Physical Control CHannel) which is used for uplink from the mobile station 102 to the base station 103, and a DPCCH 107 which is used for downlink from the base station 103 to the mobile station 102. Using the DPCCHs 106 and 107, control operations, such as a synchronization control operation for the transmit-and-receive timing between the mobile station 102 and the base station 103, are carried out, and physical radio communications are maintained.

Physical channels for data transmission include a DPDCH (DCH) 108 which is used for uplink, and a DPDCH (DCH) 109 which is used for downlink. Using the DPDCHs (DCHs) 108 and 109, data which comply with conventional standard channels (DCHs) between the mobile station 102 and the base station 103 are transmitted and received.

A DPDCH (E-DCH)/DPCCH (E-DCH) 110 is a physical channel for data transmission/physical control channel for transmission which is used for transmitting data associated with E-DCH, and for transmitting modulation information at a time of transmission of E-DCH data in the uplink. DPDCH (E-DCH) and DPCCH (E-DCH) data are transmitted in a pair.

A E-DPCCH 111 is used for downlink when the base station 103 transmits a notification of the result of radio resource assignment or the result (ACK/NACK) of judgment of data reception to the mobile station 102.

In this case, up to six of DPDCH (DCH) 108 and DPDCH (E-DCH) 110 in total can be transmitted by concurrently using two or more spread codes for channel separation. It is also possible to use a DPDCH for a certain spread code for channel separation for either DCH or E-DCH.

These channels are channels which are not used in the conventional standards, and, when they are set up newly, their formats will be additionally defined by a new release of the written standard TS25.211 while the compatibility (Backward Compatibility) with the conventional standards is ensured.

Figure 2:
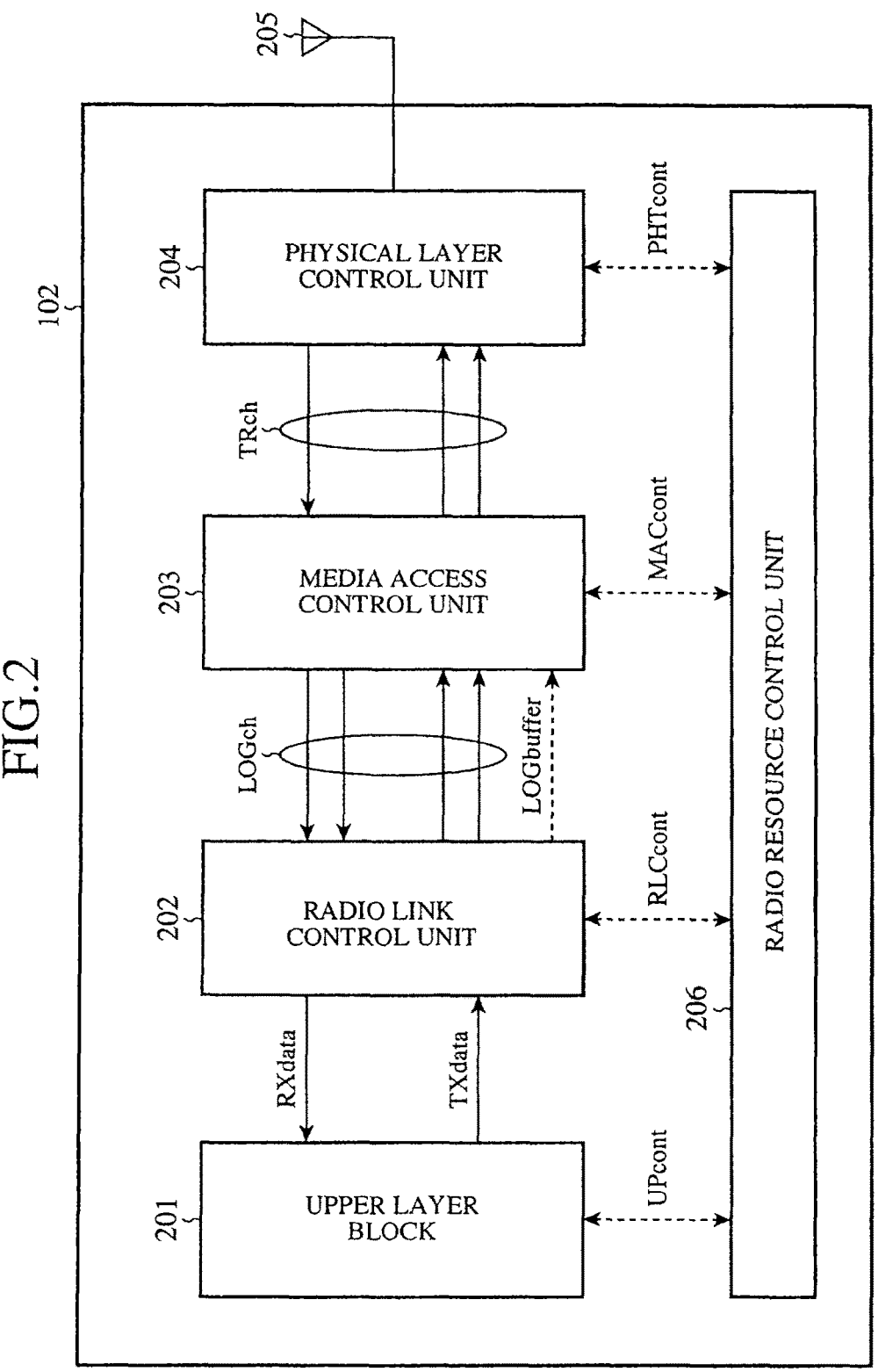
FIG. 2 is a block diagram showing the structure of a mobile station in accordance with embodiment 1 of the present invention.

FIG. 2 is a block diagram showing the structure of the mobile station 102 in accordance with embodiment 1 of the present invention.

As shown in the figure, the mobile station 102 is provided with an upper layer block 201, a radio link control unit 202, a media access control unit 203, a physical layer control unit 204, an antenna 205, and a radio resource control unit 206.

The input-output relation of each component of the mobile station 102 will be explained schematically.

The upper layer block 201 is an upper layer block of the mobile station 102, and carries out predetermined processing according to an application or using a known technique for a higher-level protocol layer such as a TCP/IP layer. The upper layer block 201 outputs one or more data (TXdata) to be transmitted to the base station 103 to the radio link control unit 202. Similarly, the upper layer block 201 inputs one or more data (RXdata) received from the base station 103 via the radio link control unit 202.

The radio link control unit 202 further exchanges data with the media access control unit 203 via one or more logical channels LOGch which are set up between the radio link control unit 202 and the media access control units 203. The radio link control unit 202 also outputs yet-to-be-transmitted data amount information LOGbuffer indicating the yet-to-be-transmitted data amount of transmit buffer thereof to the media access control unit 203.

The media access control unit 203 exchanges data with the physical layer control unit 204 via one or more transport channels TRch which are set up between the media access control unit 203 and the physical layer control units 204.

The physical layer control unit 204 carries out radio communications with the base station 103 by transmitting or receiving a radio frequency signal to or from the base station via the antenna 205.

The radio resource control unit 206 exchanges various pieces of control information UPcont, RLC (Radio Link Control) cont, MAC (Media Access Control) cont, and PHY (Physical) cont with the upper layer block 201, radio link control unit 202, media access control unit 203, and physical layer control unit 204, respectively. These pieces of control information are information which is used in known art and information peculiar to this embodiment 1.

Figure 3:
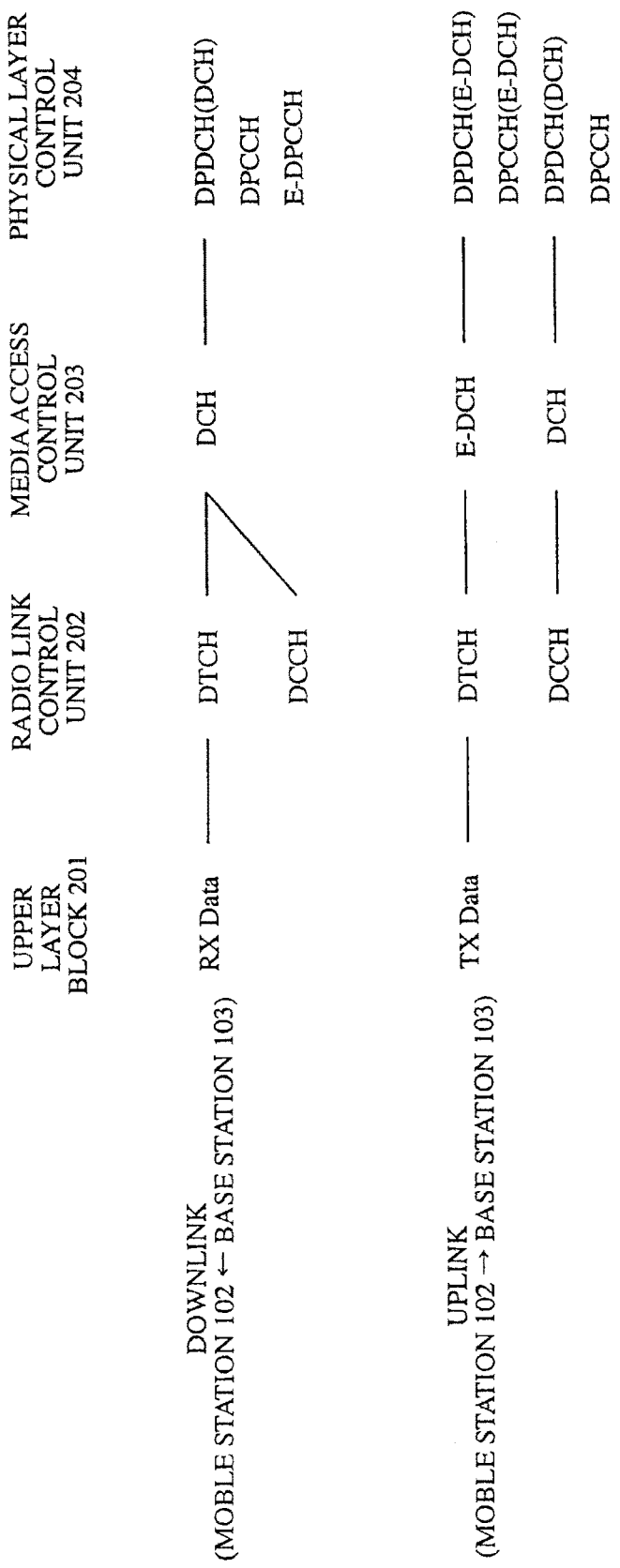
FIG. 3 is a diagram showing a multiplexing relationship between channels in each component of the mobile station in accordance with embodiment 1 of the present invention.

FIG. 3 is a diagram indicating a multiplexing relation between each block of the mobile station 102 and each channel which are provided in this embodiment 1.

Assume that one communication service is carried out in this embodiment 1. Further assume that transmit and receive data (TXdata and RXdata) for service are assigned to a logical channel DTCH (Dedicated Traffic CHannel).

The transmission data (TXdata) is assigned to the logical channel DTCH in the uplink. DTCH data is assigned to the E-DCH which is a transport channel. E-DCH data is assigned to the DPDCH (E-DCH) 110 for uplink. On the other hand, various pieces of control information to be transmitted from the radio resource control unit 206 to the base station control apparatus 104 via the base station 103 are assigned to a logical channel DCCH (Dedicated Control CHannel) by the radio link control unit 202. DCCH data is assigned to the DCH for uplink. The assignment method of this embodiment 1 is only an example, and the assignment is set up in advance of data communications or in the course of data communications.

The physical layer control unit 204 generates data for the DPCCH 106 and DPCCH (E-DCH) 110 which are channels for uplink control.

On the other hand, data for the DPDCH (DCH) 109 for downlink is assigned to the DCH in the downlink. DCH data is assigned to the DTCH and DCCH. Received data (RXdata) is extracted from the DTCH. The physical layer control unit 204 also uses the DPCCH 107 and E-DPCCH 111 for downlink.

Figure 4:
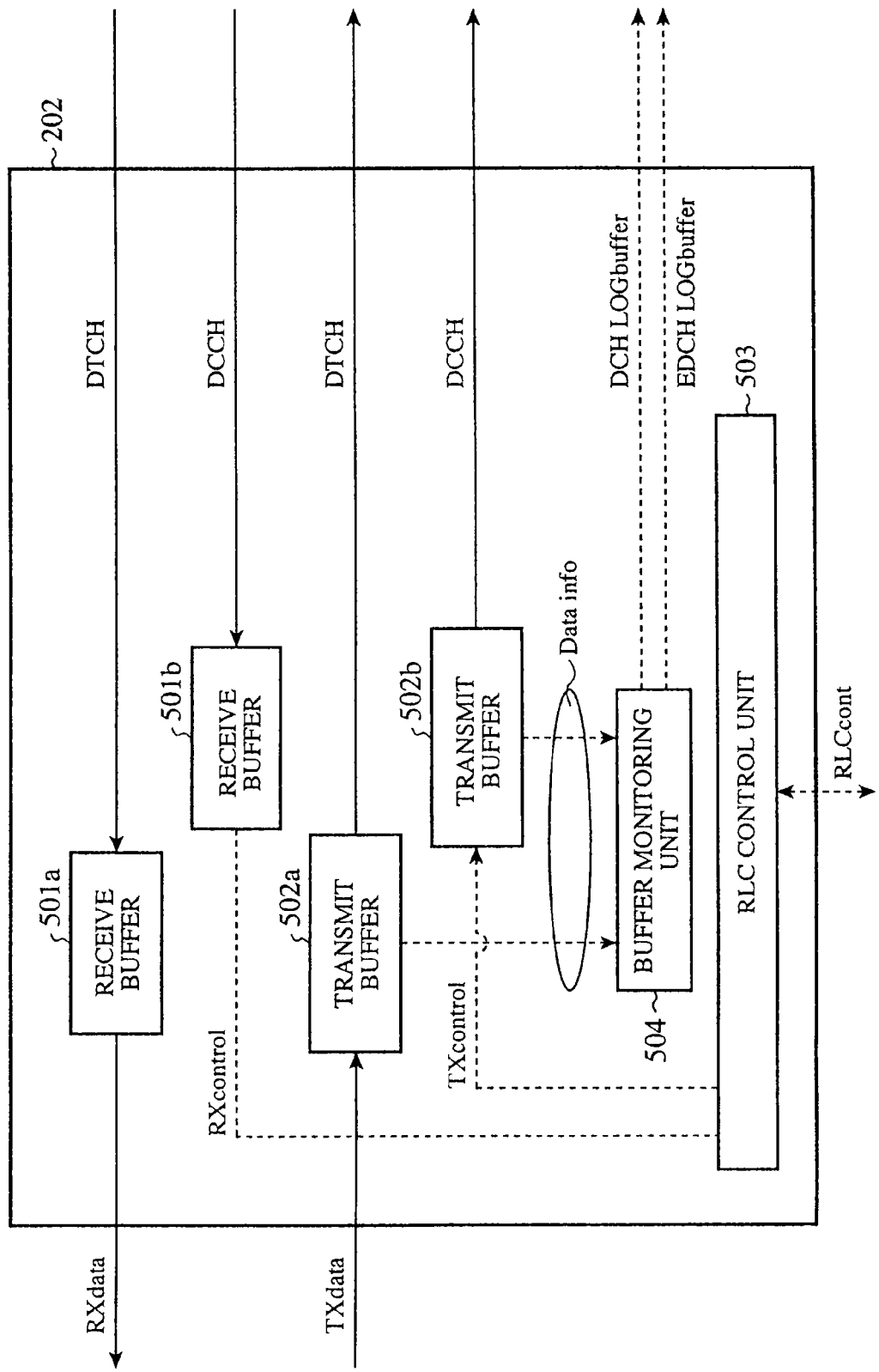
FIG. 4 is a block diagram showing the structure of a radio link control unit of the mobile station in accordance with embodiment 1 of the present invention.

FIG. 4 is a block diagram showing the structure of the radio link control unit 202 of the mobile station 102. As shown in the figure, the radio link control unit 202 is provided with a receive buffer 501a, a receive buffer 501b, a transmit buffer 502a, a transmit buffer 502b, an RLC control unit 503, and a buffer monitoring unit 504.

The input-output relation of each component of the radio link control unit 202 will be explained schematically.

The receive buffer 501a inputs the DTCH data from the media access control unit 203 and also outputs the received data (RXdata) to the upper layer block 201. The receive buffer 501b inputs the DCCH data from the media access control unit 203 and also outputs the control information (RXcontrol) to the RLC control unit 503. The transmit buffer 502a inputs the transmission data (TXdata) from the upper layer block 201 and also outputs the DTCH data (RLC PDU) to the media access control unit 203. The transmit buffer 502b inputs the control information (TXcontrol) from the RLC control unit 503 and also outputs the DCCH data (RLC PDU) to the media access control unit 203. Each of the transmit buffers 502a and 502b outputs information (Data info) about the amount of data stored therein to the buffer monitoring unit 504.

The buffer monitoring unit 504 outputs the amount-of-data information (DCH LOGbuffer) about the amount of data associated with each logical channel which is multiplexed into the DCH, and the amount-of-data information (EDCH LOGbuffer) on the amount of data associated with each logical channel which is multiplexed into the E-DCH to the media access control unit 203 on the basis of the amount-of-data information (Data info). The reason why the plural pieces of amount-of-data information are provided is because the amount-of-data information on the logical channel currently assigned to the DCH and the amount-of-data information on the logical channel currently assigned to the E-DCH are transmitted independently to the media access control unit 203. The function of thus measuring the amount-of-data information for each transport channel is called Traffic volume measurement in the conventional standards, and is defined by the written standard TS25.331 and so on. In this embodiment 1, the Traffic volume measurement is also applied for the E-DCH, as well as for the DCH which is a conventional channel.

The RLC control unit 503 controls the whole of the radio link control unit 202. The RLC control unit 50 further exchanges the control information RLCcont with the radio resource control unit 20. Information used by known art and information in accordance with the present invention are included in the control information RLCcont.

Figure 5:
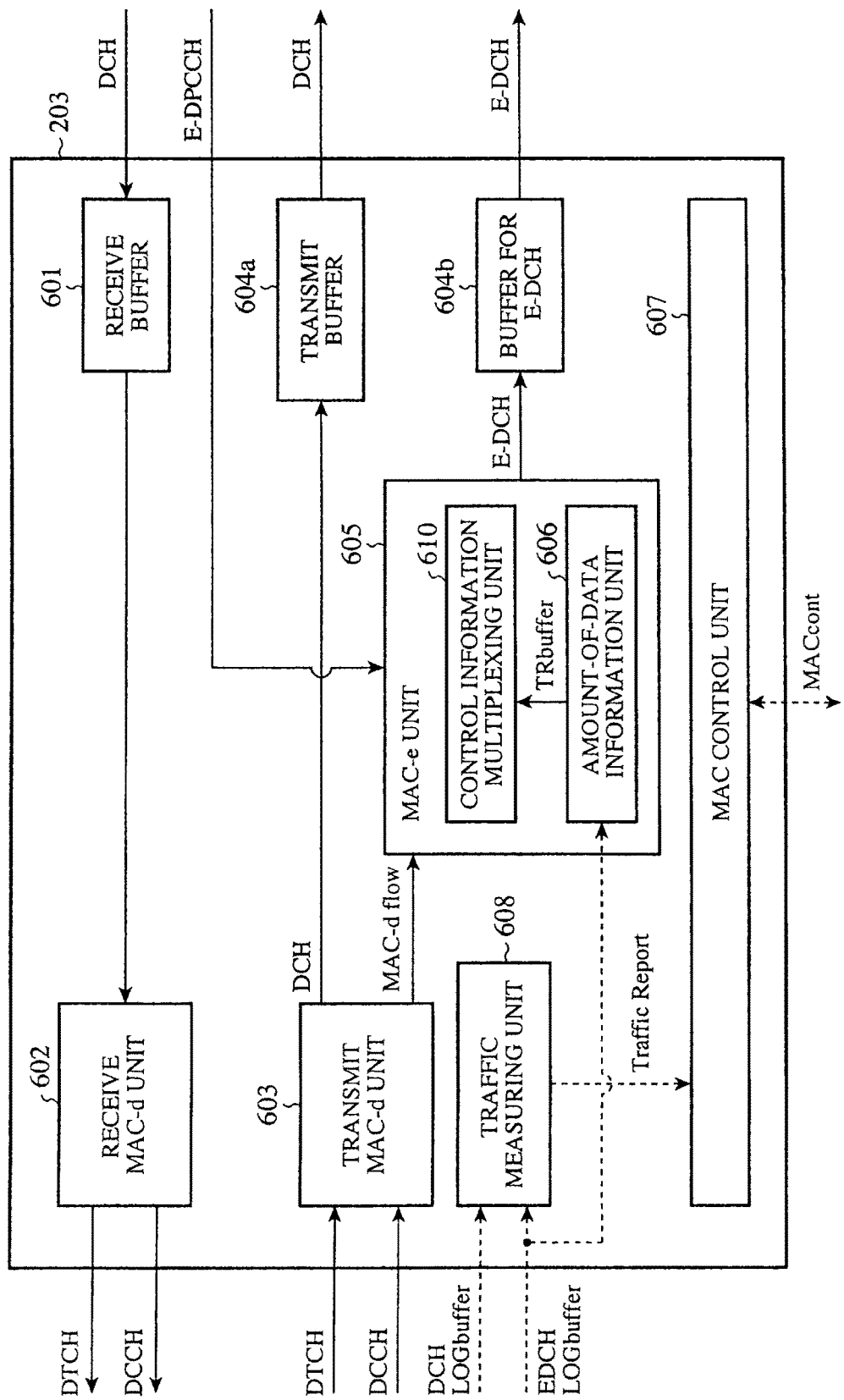
FIG. 5 is a block diagram showing the structure of a media access control unit of the mobile station in accordance with embodiment 1 of the present invention.

FIG. 5 is a block diagram showing the structure of the media access control unit 203 of the mobile station 102.

The media access control unit 203 is provided with a receive buffer 601, a receive MAC-d unit 602, a transmit MAC-d unit 603, a transmit buffer 604a, a buffer 604b for E-DCH, a MAC-e unit 605, a MAC control unit 607, and a traffic measuring unit 608.

The MAC-e unit 605 is provided with an amount-of-data information unit 606 and a control information multiplexing unit 610.

The input-output relation of each component of the media access control unit 203 will be explained schematically.

The receive buffer 601 inputs the DCH data from the physical layer control unit 204 and also outputs the received DCH data to the receive MAC-d unit 602. The receive MAC-d unit 602 demultiplexes the data associated with the logical channels DTCH and DCCH which are multiplexed into the inputted DCH using a known technique, and outputs them to the receive buffers 501a and 501b of the radio link control unit 202, respectively. The transmit MAC-d unit 603 multiplexes or distributes the data associated with the logical channels DTCH and DCCH using a known technique, and outputs them to the transmit buffer 604a as DCH data or to the MAC-e unit 605 as MAC-d flow data (MAC-d PDU).

The traffic measuring unit 608 inputs the amount-of-data information DCH LOGbuffer and amount-of-data information EDCH LOGbuffer from the radio link control unit 202. The traffic measuring unit 608 also outputs traffic report information (Traffic Report) to the MAC control unit 607 in order to notify the amount-of-data information to the base station control apparatus 104 via the base station 103.

The MAC-e unit 605 inputs the MAC-d flow data from the transmit MAC-d unit 603 and also outputs the E-DCH data (MAC-e PDU) to the buffer 604b for E-DCH. Furthermore, the MAC-e unit 605 inputs the E-DCH amount-of-data information (EDCH LOGbuffer) from the radio link control unit 202 to the amount-of-data information unit 606, and outputs second amount-of-data information (TRbuffer) from the amount-of-data information unit 606 to the control information multiplexing unit 610. The details of the operation of the MAC-e unit 605 will be explained below.

The MAC control unit 607 controls the whole of the media access control unit 203. Simultaneously, the MAC control unit 607 exchanges control information (MACcont) including information required for known art and information required for the present invention with the radio resource control unit 206.

Figure 6:
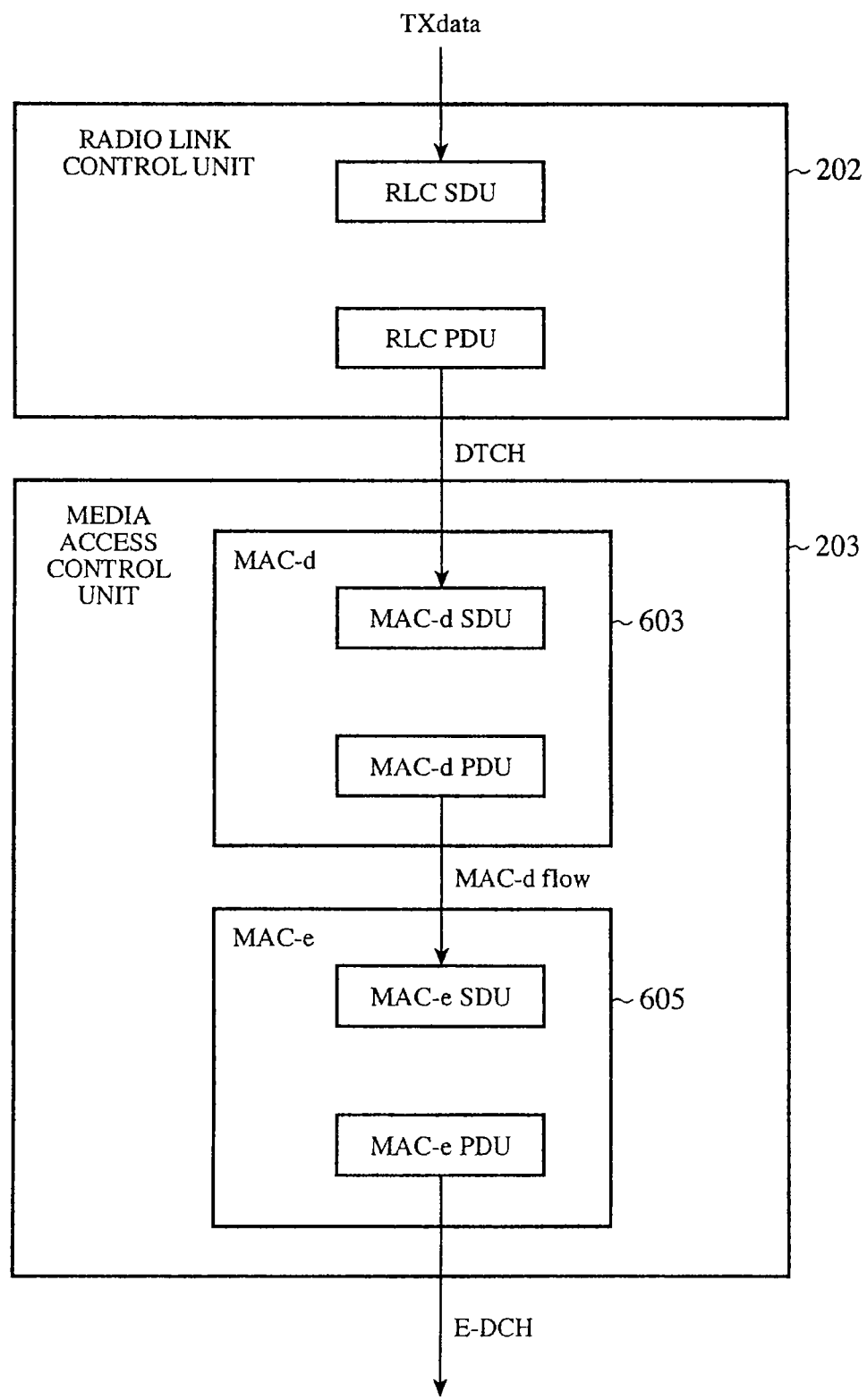
FIG. 6 is a diagram showing input/output data transmitted between the radio link control unit and media access control unit of the mobile station in accordance with embodiment 1 of the present invention at a time of transmission of the data.

FIG. 6 is a diagram showing input/output data transmitted between the radio link control unit 202 and media access control unit 203 of the mobile station 102 at a time of transmission of the data. Hereafter, data associated with the E-DCH will be explained, and the explanation of data associated with the DCH will be omitted because it is not related directly with the present invention.

In the media access control unit 203, the MAC-d unit 603 is a portion which complies with the conventional standards. Furthermore, the MAC-e unit 605 is a portion associated with the E-DCH.

When the transmission data (TXdata) are furnished from the upper layer block 201 to the radio link control unit 202, they are outputted to the media access control unit 203 as DTCH data after being subjected to various processings. After the DTCH data inputted to the media access control unit 203 are inputted to the MAC-d unit 603 in the media access control unit 203, they are inputted to the MAC-e unit 605 as MAC-d flow after being subjected to various processings. Next, the MAC-d flow data (MAC-d PDU) inputted to the MAC-e unit 605 are outputted, as E-DCH data, from the MAC-e unit 605 after being subjected to various processings.

The data inputted to the radio link control unit 202 are called RLC SDU (Service Data Unit) in the radio link control unit 202. The data outputted from the radio link control unit 202 are called RLC PDU (Protocol Data Unit) in the radio link control unit 202.

The data inputted to the MAC-d unit 603 are called MAC-d SDU in the MAC-d unit 603. The data outputted from the MAC-d unit 603 are called MAC-d PDU in the MAC-d unit 603.

The data inputted to the MAC-e unit 605 are called MAC-e SDU in the MAC-e unit 605. The data outputted from the MAC-e unit 605 are called MAC-e PDU in the MAC-e unit 605.

Figure 7:
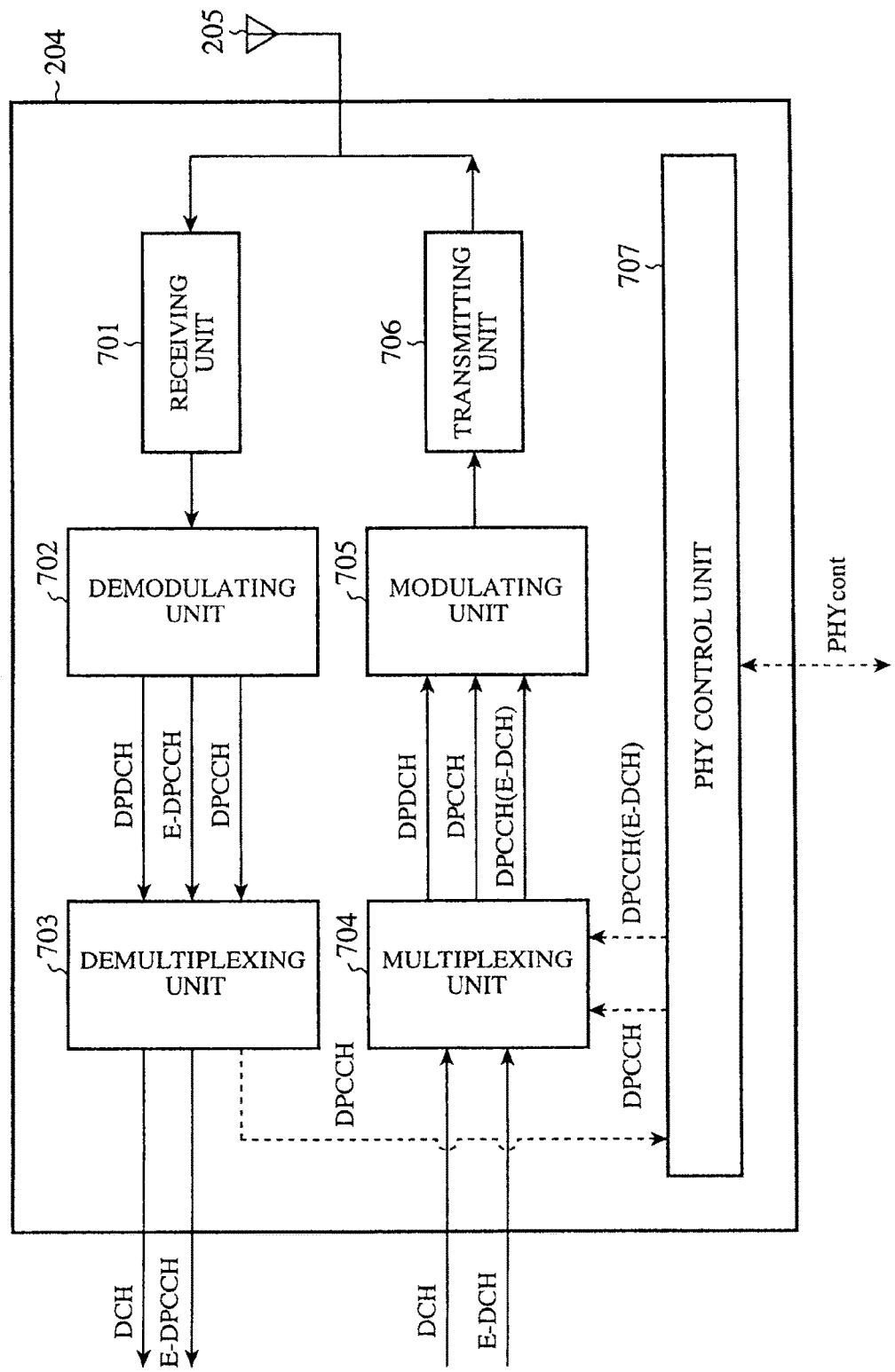
FIG. 7 is a block diagram showing the structure of a physical layer control unit of the mobile station in accordance with embodiment 1 of the present invention.

FIG. 7 is a block diagram showing the structure of the physical layer control unit 204 of the mobile station 102. The physical layer control unit 204 is provided with a receiving unit 701, a demodulating unit 702, a demultiplexing unit 703, a multiplexing unit 704, a modulating unit 705, a transmitting unit 706, a PHY control unit 707, and an antenna 205.

The input-output relation of each component of the physical layer control unit 204 will be explained schematically.

The receiving unit 701 converts a radio frequency signal received, via the antenna 205, from the base station 103 into a baseband signal using a known technique, and then outputs it to the demodulating unit 702. The demodulating unit 702 demodulates the baseband signal outputted from the receiving unit 701 using a known technique, and then outputs data associated with physical channels DPDCH, DPCCH, and E-DPCCH for downlink to the demultiplexing unit 703. The demultiplexing unit 703 demultiplexes the inputted DPDCH, DPCCH, and E-DPCCH into DCH data and data associated with the physical control channels DPCCH and E-DPCCH using a known technique. The demultiplexing unit 703 further outputs the DCH data and E-DPCCH data to the media access control unit 203 and also outputs the DPCCH data to the PHY control unit 707. In this embodiment 1, assume that the DCH is an only transport channel which is multiplexed into the receive DPDCH.

On the other hand, the multiplexing unit 704 inputs the uplink DCH data and E-DCH data from the media access control unit 203. The multiplexing unit 704 inputs the uplink DPCCH data and DPCCH (E-DCH) data from the PHY control unit 707. The multiplexing unit 704 carries out multiplexing of the inputted various channel data using a known technique, and outputs them to the modulating unit 705 as data associated with the transmit physical channels DPDCH, DPCCH, and DPCCH (E-DCH). The modulating unit 705 modulates the inputted data associated with the transmit physical channels DPDCH, DPCCH, and DPCCH (E-DCH) using a known technique, and then outputs the modulated data to the transmitting unit 706 as a transmission baseband signal.

In this embodiment 1, the DPDCH, DPCCH, and DPCCH (E-DCH) data are code-multiplexed using different spread codes, respectively, and the multiplexing method itself is not limited to the one shown in this embodiment 1.

The transmitting unit 706 converts the inputted baseband signal into a radio frequency signal using a known technique. The converted radio frequency signal is transmitted to the base station 103 via the antenna 205. The PHY control unit 707 controls the whole of the physical layer control unit 204. The PHY control unit 707 exchanges the control information PHYcont including information required for known art and information required for the present invention with the radio resource control units 206.

Figure 8:
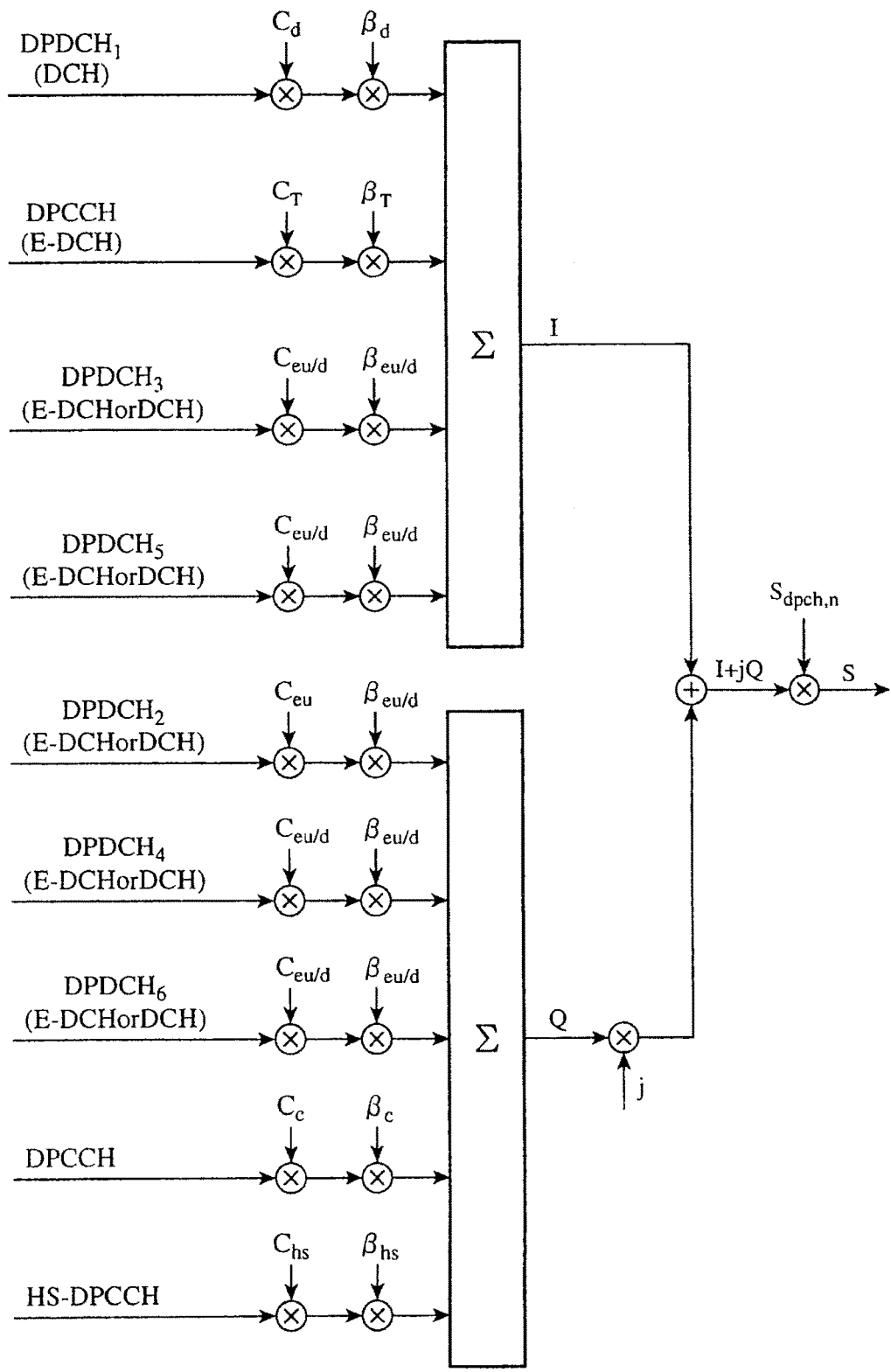
FIG. 8 is a diagram showing the principle of multiplexing of channels in the media access control unit and physical layer control unit of the mobile station in accordance with embodiment 1 of the present invention.

FIG. 8 is a diagram showing a multiplexing relation between the transport channels and the physical channels in the uplink in accordance with embodiment 1, and the principle of the channel multiplexing. The principle of similar channel multiplexing is defined by the written standard TS25.213. This multiplexing processing is carried out by the physical layer control unit 204 of the mobile station 102.

In the figure, each of DPDCH1 to DPDCH6 corresponds to the DPDCH (DCH) 108 or DPDCH (E-DCH) 110. HS-DPCCH is a physical channel additionally provided by release 5, and because it is not related to the present invention, the explanation of the channel will be omitted hereafter. Cd is a spread code for channel separation for DPDCH (DCH). Cc is a spread code for channel separation for DPCCH. CT is a spread code for channel separation for DPCCH (E-DCH). Chs is a spread code for channel separation for HS-DPCCH. Ceu is a spread code for channel separation for DPDCH (E-DCH). $\beta d$ is a signal amplitude coefficient for DPDCH (DCH). $\beta c$ is a signal amplitude coefficient for DPCCH. $\beta hs$ is a signal amplitude coefficient for HS-DPCCH. $\beta T$ is a signal amplitude coefficient for DPCCH (E-DCH). $\beta eu$ is a signal amplitude coefficient for DPDCH (E-DCH). Sdpch,n is a scramble code for mobile station identification.

DPDCH1, DPDCH3, DPDCH5, and DPCCH (E-DCH) data are multiplied by their respective spread codes for channel separation and signal amplitude coefficients, and, after that, the multiplication results are summed by an adder ($\Sigma$) for I-axis. On the other hand, DPDCH2, DPDCH4, DPDCH6, DPCCH, and HS-DPCCH data are multiplied by their respective spread codes for channel separation and signal amplitude coefficients, and, after that, the multiplication results are summed by an adder ($\Sigma$) for Q-axis. The outputs of the adders are the I component and Q component of a complex signal (=I+jQ).

Next, the sum of DPDCH2, DPDCH4, DPDCH6, DPCCH, and HS-DPCCH data which is acquired by the adder for Q-axis is multiplied by the imaginary number j so that the sum is assigned to the Q-axis side of the complex signal. This shows that the sum is actually processed as the Q component of the complex signal in the mobile station 102.

After that, the sum is added to the other sum of the DPDCH1, DPDCH3, DPDCH5 and DPCCH (E-DCH) data which is acquired by the adder for I-axis by an adder (+). As a result, a so-called complex signal into which the channel data are IQ-multiplexed is generated. Next, the complex signal which the channel data are IQ-multiplexed is multiplied by the scramble code Sdpch,n for mobile station identification by a multiplier (x). The generated signal is transmitted by radio from the physical layer control unit 204 to the base station 103 via the antenna 205. As new specifications (for E-DCH) are added, specifications different from those of the conventional standards may be defined for the spread codes for channel separation and the signal amplitude coefficients in a new version of the standards. For example, as a result of additionally code-multiplexing the DPDCH for E-DCH, when the PAR (Peak to Average) of the multiplexed signal increases, the increase in PAR can be eased by changing the spread codes for channel separation and the signal amplitude coefficients.

Next, the structure of the base station side will be explained. The base station side includes the base station 103 and the base station control apparatus 104. Because the fundamental structure of the base station side is much the same as that of the mobile station 102 in which the uplink related block and the downlink related link block are interchanged, blocks different from those of the mobile station 102 will be explained below.

Figure 9:
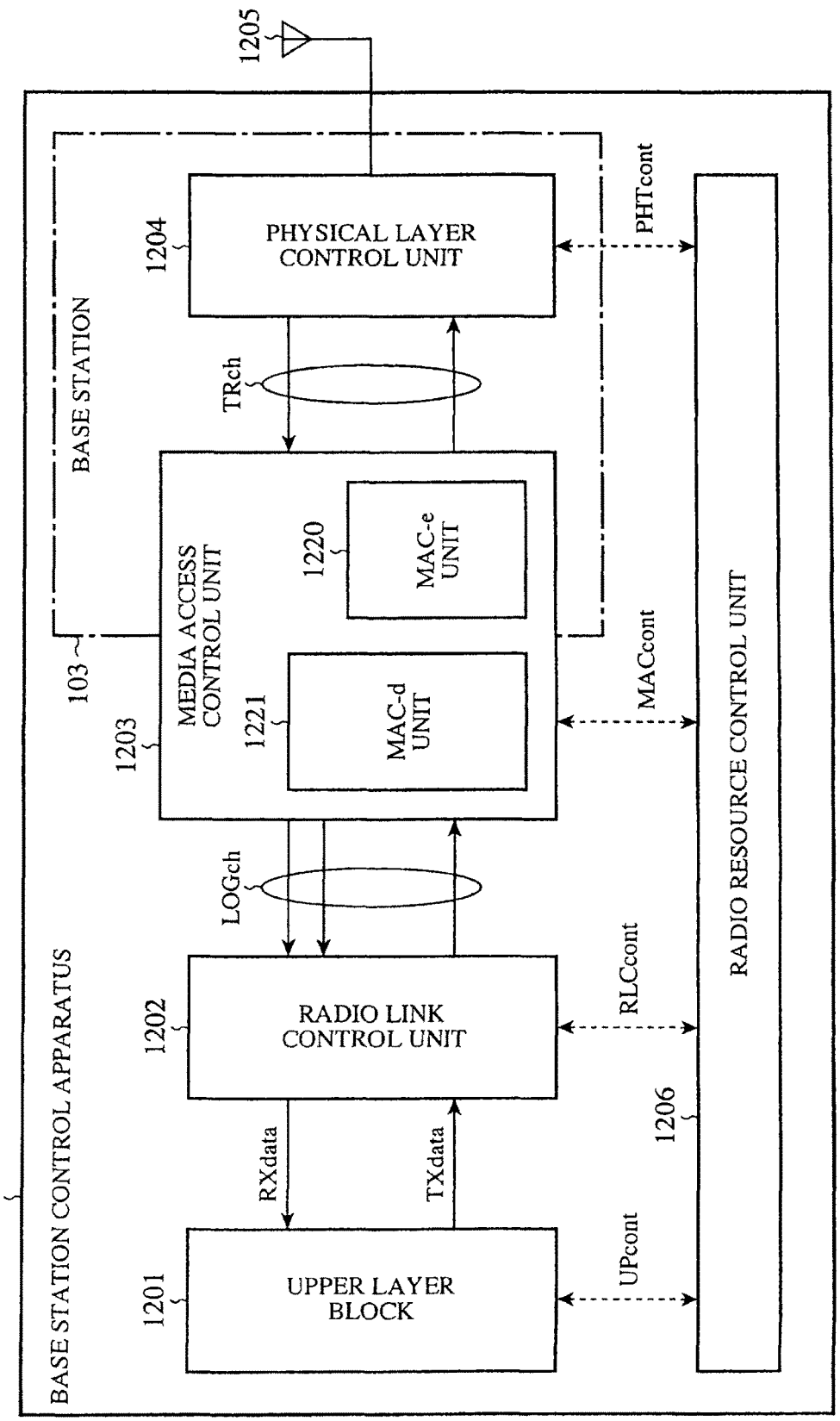
FIG. 9 is a block diagram showing the structure of a base station side (a base station and a base station control apparatus) in accordance with embodiment 1 of the present invention.

FIG. 9 is a block diagram showing the structure of the base station side (the base station 103 and base station control apparatus 104). As shown in the figure, the base station side is provided with an upper layer block 1201, a radio link control unit 1202, a media access control unit 1203, a physical layer control unit 1204, an antenna 1205, and a radio resource control unit 1206. The media access control unit 1203 is provided with a MAC-e unit 1220 according to this embodiment of the present invention, and a MAC-d unit 1221 according to the conventional standards.

While the mobile station 102 has all the blocks thereof therein, all the blocks on the base station side are distributed between the base station control apparatus 104 and base station 103. The method of distributing all the blocks between the base station control apparatus and base station depends on the implementation of these apparatus. In this embodiment 1, the upper layer block 1201, radio link control unit 1202, and radio resource control unit 1206 are arranged in the base station control apparatus 104.

The media access control unit 1203 is distributed between the base station control apparatus 104 and base station 103. The physical layer control unit 1204 is arranged in the base station 103. Since the structures and operations of the upper layer block unit 1201, radio link control unit 102, and radio resource control unit 1206 are the same as those of the mobile station 102, respectively, the explanation of these components will be omitted hereafter.

Figure 10:
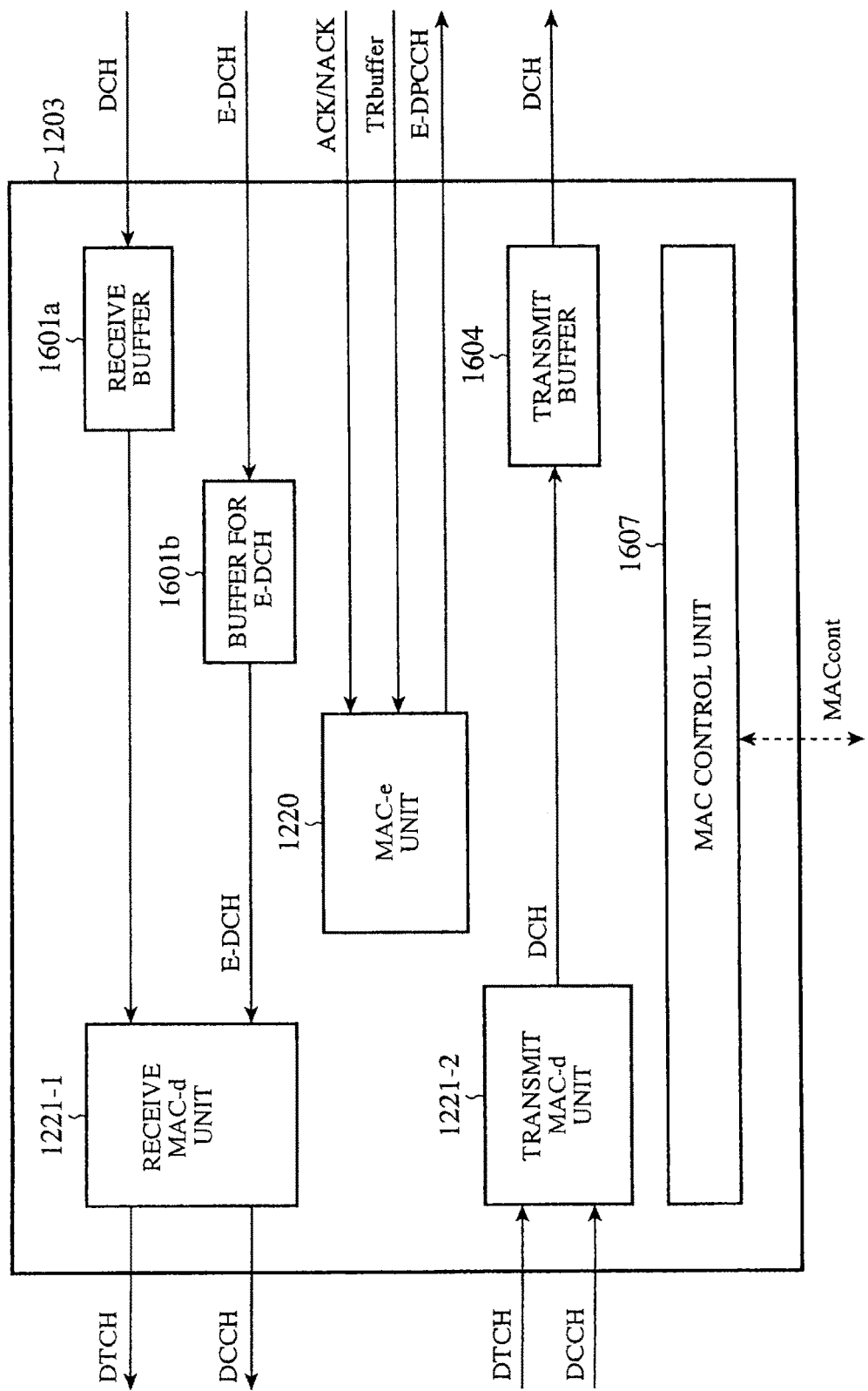
FIG. 10 is a block diagram showing the structure of a media access control unit on the base station side in accordance with embodiment 1 of the present invention.

FIG. 10 is a block diagram showing the structure of the media access control unit 1203 on the base station side. As shown in the figure, the media access control unit 1203 is provided with a MAC-e unit 1220, a receive MAC-d unit 1221-1, a transmit MAC-d unit 1221-2, a receive buffer 1601*a*, a buffer 1601*b* for E-DCH, a transmit buffer 1604, and a MAC control unit 1607.

Next, the input-output relation of each component of the media access control unit 1203 will be explained schematically.

The operation of each of the receive MAC-d unit 1221-1, transmit MAC-d unit 1221-2, receive buffer 1601*a*, buffer 1601*b* for E-DCH, transmit buffer 1604, and MAC control unit 1607 is the same as that of a corresponding unit of a structure in which the uplink block and the downlink block are interchanged, and the MAC-e unit 605 is omitted in the media access control unit 203 of the mobile station 102, the explanation of the operation will be omitted hereafter.

The MAC-e unit 1220 inputs both a reception judgment result ACK/NACK from the physical layer control unit 1204 and report information TRbuffer notified from the mobile station 102. The MAC-e unit 1220 also carries out radio resource control about the uplink E-DCH, i.e., carries out scheduling. The MAC-e unit 1220 further outputs the downlink E-DPCCH to the physical layer control unit 1204.

Figure 11:
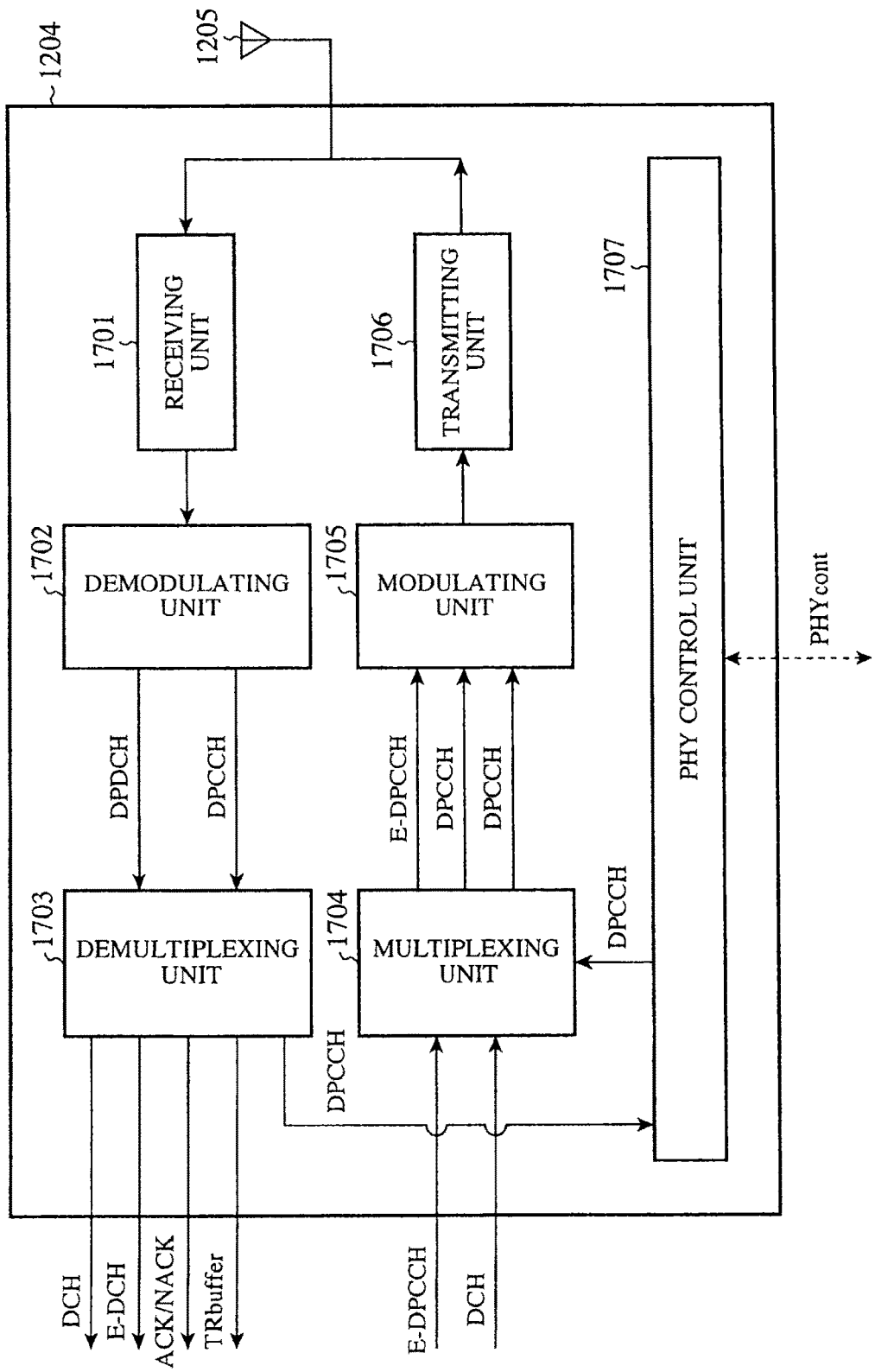
FIG. 11 is a block diagram showing the structure of a physical layer control unit on the base station side in accordance with embodiment 1 of the present invention.

FIG. 11 is a block diagram showing the structure of the physical layer control unit 1204 on the base station side. As shown in the figure, the physical layer control unit 1204 is provided with a receiving unit 1701, a demodulating unit 1702, a demultiplexing unit 1703, a multiplexing unit 1704, a modulating unit 1705, a transmitting unit 1706, a PHY control unit 1707, and an antenna 1205.

Next, the input-output relation of each component of the physical layer control unit 1204 will be explained.

Because the operation of each of the antenna 1205, receiving unit 1701, demodulating unit 1702, modulating unit 1705, and transmitting unit 1706 is the same as that of the corresponding component of the mobile station 102, the explanation of the operation will be omitted hereafter.

The demultiplexing unit 1703 inputs demodulated data from the demodulating unit 1702 via the uplink physical channels DPDCH and DPCCH. The demultiplexing unit 1703 also demultiplexes the uplink DPDCH data into received DCH data and received E-DCH data using a known technique. The demultiplexing unit 1703 further outputs a reception judgment result ACK/NACK for the E-DCH data to the Mac-e unit 1220 of the MAC unit 1203. The demultiplexing unit 1703 also outputs the demultiplexed report information TRbuffer to the MAC-e unit 1220. The demultiplexing unit 1703 further outputs the demultiplexed uplink DPCCH data to the PHY control unit 1707.

The multiplexing unit 1704 carries out multiplexing of the downlink DCH data from the transmit buffer 1604, the downlink E-DPCCH data from the MAC-e unit 1220, and the downlink DPCCH data from the PHY control unit 1707 using a known technique, and outputs them to the modulating unit 1705.

Next, the operation of transmission of packets via the uplink will be explained.

Figure 12:
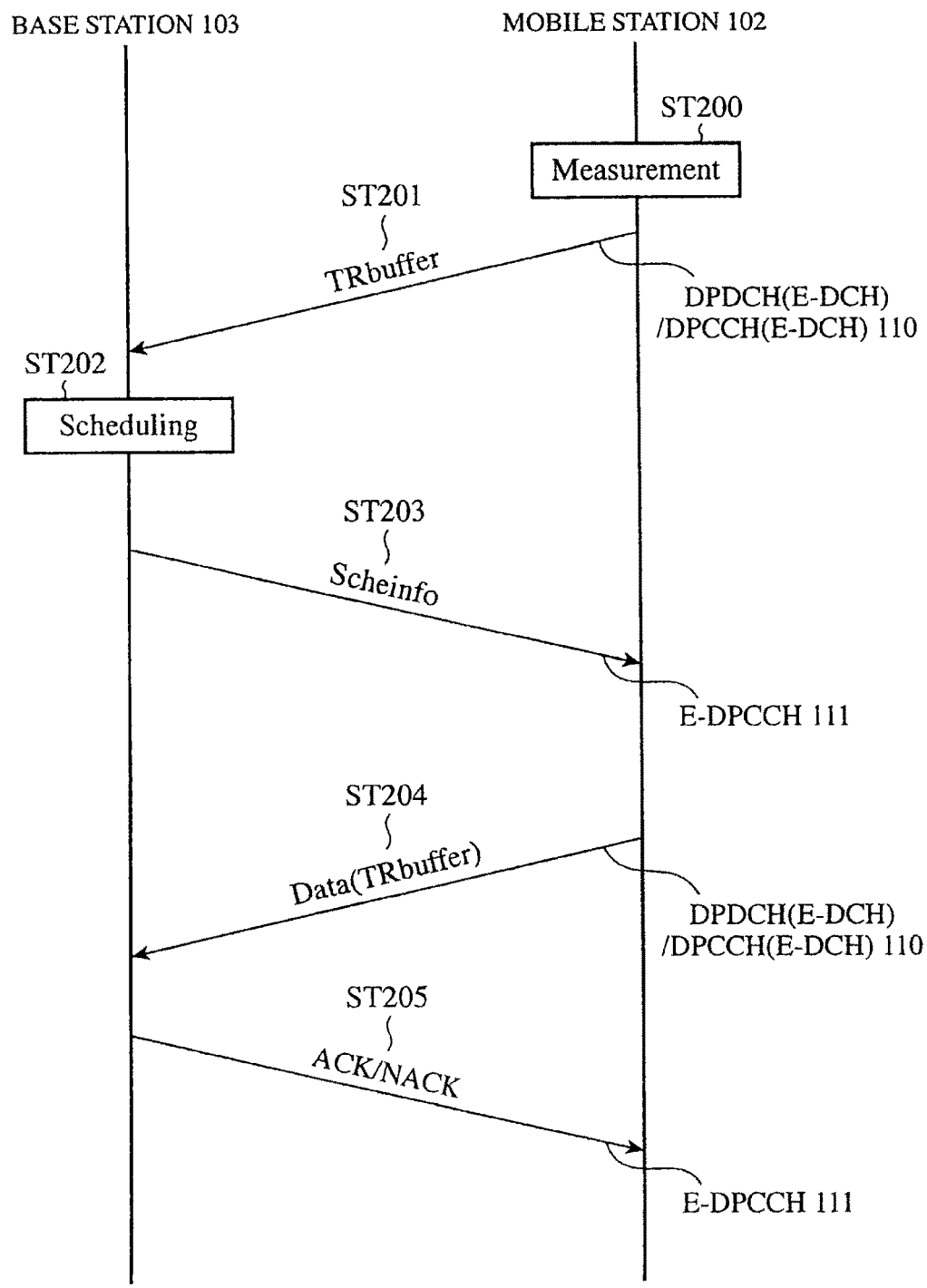
FIG. 12 is a diagram showing a flow of packet transmission from the mobile station to the base station in accordance with embodiment 1 of the present invention.

FIG. 12 is a diagram showing a flow of transmission of packets from the mobile station to the base station in accordance with embodiment 1.

Hereafter, because the explanation of the DPCCH 106 which is a physical control channel defined by the conventional standard is unnecessary, the explanation of the DPCCH 106 will be omitted. Furthermore, because the transmission of the DCH data from the base station 103 is not a matter peculiar to the present invention, the explanation of the transmission of the DCH data will be omitted hereafter.

First, in step ST200, the mobile station 102 measures the amount (Measurement) of yet-to-be-transmitted data as a piece of status information of the mobile station 102 (in step ST200).

Targets to be measured can include the amount of data stored in each buffer of the radio link control unit 202, the amount of data stored in each buffer of the media access control unit 203, and the amounts of yet-to-be-transmitted data organized according to priorities assigned to the yet-to-be-transmitted data. Furthermore, when the mobile station has a retransmission control function ARQ (Automatic Repeat reQuest), the targets to be measured can include the amounts of data organized according to priorities about retransmission control. In this embodiment 1, as the report information (TRbuffer) which the mobile station 102 notifies to the base station 103 for the scheduling, the amount of data stored in each of the transmit buffers 502*a* and 502*b* of the radio link control unit 202 is used.

As an alternative, as the status information of the mobile station 102, there can be provided transmit power from the mobile station 102 (i.e., the total transmit power of the mobile station or the transmit power of a specific channel) or its statistic value, a transmit power margin or its statistic value, the priority of the yet-to-be-transmitted data or its statistic value, and a transmission rate or its statistic value. These quantities can be measured at the same time when the above-mentioned measurement of the amount of yet-to-be-transmitted data is performed, or can be measured at a different time.

The operation of the mobile station 102 in step ST200 will be explained in detail.

First, when a communication service occurs in the upper layer block 201, data for the service is stored in the transmit buffer 502*a* of the radio link control unit 202 as transmission data (TXdata). After that, the data stored in the transmit buffer 502*a* is outputted to the transmit MAC-d unit 603 of the media access control unit 203 as transmission data associated with the logical channel DTCH. Various pieces of well-known transmission control information (TXcontrol) about the communication service are stored in the transmit buffer 502*b*. The pieces of transmission control information (TXcontrol) stored in the transmit buffer 502*b* are outputted from the transmit buffer 502*b* to the transmit MAC-d unit 603 of the media access control unit 203 as logical channel DCCH data for control.

In each of the transmit buffers 502*a* and 502*b* of the radio link control unit 202, a sequential number TSN (Transmission Sequential Number) is added to each transmission unit quantity of each logical channel data. This addition of the sequential number makes it possible to judge whether a lack occurs in some of the data due to communication errors, or whether the data reach the base station 103 in the correct order. Furthermore, the addition of the sequential number makes it possible for the base station 103 to reconstruct the data sequence on the basis of the number. As an alternative, the addition of TSN can be performed by the transmit MAC-d unit 603 of the media access control unit 203. Whether the addition of TSN is performed by either the radio link control unit or the media access control unit will be defined by standards. In accordance with the present invention, either one of them can implement the addition of TSN.

From each of the transmit buffers 502*a* and 502*b*, the amount-of-data information indicating the amount of data stored in each buffer (Data info) is outputted to the buffer monitoring unit 504. This notification can be carried out at regular intervals, when the amount of data varies, at another timing, or when a certain condition is satisfied. The condition is beforehand set up in the mobile station 102 by the radio resource control unit 206 on the basis of an exchange of information with the base station side before the communications are started.

The buffer monitoring unit 504 groups the inputted amount-of-data information (Data info) into the amount-of-data information for transport channel DCH and the amount-of-data information for E-DCH. The grouped pieces of amount-of-data information (Data info) are outputted as DCH data information (DCH LOGbuffer) and E-DCH data information (EDCH LOGbuffer) for each logical channel.

The pieces of data information (DCH LOGbuffer and EDCH LOGbuffer) outputted from the buffer monitoring unit 504 are outputted to the traffic measuring unit 608 in the media access control unit 203, and the amount-of-data information unit 606 in the MAC-e unit 605, respectively. The above-mentioned transmit and receive of information among the radio link control unit 202 and media access control units 203, and physical layer control unit 204 is called primitive.

The traffic measuring unit 608 calculates the sum total of the amounts of data associated with the logical channels currently assigned to the DCH which is a conventional channel, and the sum total of the amounts of data associated with the logical channels currently assigned to the E-DCH which is a channel according to the present invention on the basis of EDCH LOGbuffer and DCH LOGbuffer. This function is an extension of a traffic measurement report function (Traffic volume measurement) of reporting measurement results to the base station control apparatus 104, which is defined by the conventional standard. A measuring period, a measuring method, and report conditions about the E-DCH data information are defined by TS25.331, and can be set up by the base station control apparatus 104 at the time when the communications are started. The measuring period, measuring method, report conditions, etc. can be set up differently for each logical channel and for each transport channel.

Next, each calculated sum total of the amounts of data is outputted to the MAC control unit 607 according to the report conditions set up for the traffic report (Traffic Report) which is notified to the base station control apparatus 104.

The MAC control unit 607 transfers the traffic report (Traffic Report) to the radio resource control unit 206. The radio resource control unit 206 reports the traffic report (Traffic Report) transferred thereto to the base station control apparatus 104 via the radio link control unit 202, media access control unit 203, physical layer control unit 204, and antenna 205 of the mobile station 102, and the base station 103.

The amount-of-data information unit 606 converts the E-DCH data information (EDCH LOGbuffer) inputted thereto into information in the data format of the report information (TRbuffer) to notify it to the base station 103 using a known technique, and outputs it to the control information multiplexing unit 610. The sum total of the amounts of data, the amounts of data organized according to buffers, the amounts of data organized according to channels, the amounts of data organized according to priorities assigned to the data, or the like can be provided as the report information (TRbuffer), as in the case of the traffic measurement report function (Traffic volume measurement) of notifying measurement results to the base station control apparatus 104. What type of data format is used can be determined by, for example, the written standard TS25.331. In this embodiment 1, the amounts of data organized according to logical channels currently assigned to the E-DCH are used as the report information.

Next, in step ST201, the mobile station 102 transmits a request for assignment of the radio resource for uplink to the base station 103.

Hereafter, the operation of the mobile station 102 in step ST201 will be explained.

First, the report information (TRbuffer) outputted from the amount-of-data information unit 606 to the control information multiplexing unit 610 is multiplexed with the uplink MAC-d flow data (MAC-d PDU) using a known technique, and is then outputted to the MAC-e unit 605. After that, the report information multiplexed with the uplink MAC-d flow data is outputted from the MAC-e unit 605 to the buffer 604*b* for E-DCH as E-DCH data (MAC-e PDU). The control information multiplexing unit 610 carries out the multiplexing processing by adding the various pieces of information from the MAC-e unit 605, as a header, to the uplink MAC-d flow data. Actually, there may be a case in which there is no MAC-d flow data to be transmitted.

Next, the multiplexed E-DCH data are outputted from the buffer 604*b* for E-DCH to the multiplexing unit 704. The E-DCH data inputted to the multiplexing unit 704 are multiplexed using a known technique, and are outputted to the modulating unit 705 as DPDCH data.

The uplink DPCCH data and DPCCH (E-DCH) data are outputted from the PHY control unit 707, respectively, and are code-multiplexed with DPDCH data by the multiplexing unit 704, and are then outputted to the modulating unit 705. When there is no MAC-e SDU data, the DPCCH (E-DCH) data is not outputted from the PHY control unit 707.

Next, the DPDCH data, DPCCH data, and DPCCH (E-DCH) data inputted to the modulating unit 705 are modulated using a known technique. After each modulated data is processed by the transmitting unit 706, it is transmitted by radio to the base station 103 via the antenna 205.

Other mobile station information including transmit power margin information (Power margin) disclosed in nonpatent reference 1 in relation to a channel USICCH for transmission request can be included in the DPDCH (E-DCH) 110 in addition to the report information (TRbuffer). What type of information is transmitted simultaneously with the report information (TRbuffer) depends upon both the structure of a scheduler mounted in the MAC-e unit 1220 of the base station 103, and the radio resource management method, and the details of what type of information is transmitted simultaneously with the report information will be defined by the written standard TS25.331 (RRC signaling).

When multiplexing the report information (TRbuffer) included in the E-DCH data (MAC-e PDU) into the DPDCH (E-DCH) 110, the mobile station 102 can convert the report information into information in a certain expression form, such as 1. an amount of data (bit number), 2. an index indicating a combination of amounts of data, 3. a buffer occupation ratio (%), 4. an index indicating a combination of buffer occupation ratios, 5. a statistic of the amount of data or buffer occupation ratio, 6. an index of the statistic, 7. a change in the amount of data, 8. an index indicating the change in the amount of data, 9. a threshold of the amount of data to be reported, 10. an index of the threshold, 11. an amount of increase or decrease, 12. an index of the amount of increase or decrease, 13. a requested transmission rate converted based on the amount of data, 14. an index of the requested transmission rate, or 15. a predicted transmission rate converted based on the amount of data. The multiplexing processing is defined by the written standard TS25.212, and a correspondence between the amount-of-data information and the index will be defined by the written standard TS25.214.

Next, the operation of receiving the DPDCH (E-DCH) 110 of the base station 103 will be explained.

The uplink DPDCH (E-DCH) 110 data received via the antenna 1205 is processed by the receiving unit 1701, demodulating unit 1702, and demultiplexing unit 1703 using a known technique, respectively. Upper layer data (MAC-e SDU) demultiplexed from the DPDCH (E-DCH) data is outputted, as E-DCH data, from the demultiplexing unit 1703 to the buffer 1601*b* for E-DCH.

The report information (TRbuffer) is also demultiplexed from the inputted data by the demultiplexing unit 1703, and is inputted to the MAC-e unit 1220.

Next, in step ST202, the MAC-e unit 1220 of the base station 103 carries out assignment (scheduling) of the radio resource for uplink to the mobile station 102.

The scheduling operation of the base station 103 in step ST202 will be explained.

The MAC-e unit 1220 measures and predicts an increase in the power (Noise Rise) which is caused by the transmission of packets from the mobile station 102, and carries out uplink scheduling so that the sum total of the increase falls within the reception power margin value of the base station 103. Information which can be used when the scheduling is carried out includes: 1. the type and QoS of the communication service of the mobile station 102; 2. the setup of the transmission rate; 3. the communication environment; 4. the amount of data received by the base station; 5. the amount-of-data information about the amount of data of the mobile station 102; 6. the uplink quality (pass loss), etc. Which information is used depends on the implementation of the scheduler.

As the scheduling method, any of the following methods: 1. a method of giving a higher priority to a mobile station 102 having a larger amount of yet-to-be-transmitted packets; 2. a method of giving a higher priority to a mobile station 102 having a transmission power margin; 3. a method of assigning the radio resource to mobile stations in order that they have transmitted a request for permission to transmit packets to the base station; 4. a method of assigning the radio source to the mobile stations 102 in the decided order (the method is called Round Robin); 5. a method of assigning the radio resource to a mobile station 102 with a little propagation loss or having a good communication environment with little interference on a priority basis (the method is called Max C/I); 6. a method intermediate between Round Robin and Max C/I (the method is called Proportional Fairness); 7. a method of giving a higher priority to a mobile station 102 having data with a higher priority; 8. a method of assigning the radio resource to the mobile stations so that a delay which occurs in transmission of data from each mobile station 102 to the party at the other end of the communications (for example, a computer connected to another communication network 105) is shortened; 9. a combination of two or more of the various methods 1 to 8, etc. can be applied to the scheduling. The base station and communications system are designed and chosen so that the throughput of the whole cell is maximized.

Any of the following various methods of selecting a channel on which the scheduling is to be performed: 1. a method of selecting only E-DCH, and controlling DCH by means of the base station control apparatus 104 as usual; 2. a method of controlling channels including DCH according to restrictions on the control operation of the prior art base station control apparatus 104; 3. a method of controlling channels including DCH in cooperation with the base station control apparatus 104; 4. a method of selecting the logical channels assigned to E-DCH as channels on which the scheduling is to be performed, etc. can be applied to the scheduling. The base station and communications system are designed and chosen so that the throughput of the whole cell is maximized.

Any of the following expression forms of the scheduling result: 1. a maximum transmission rate; 2. total power or channel power; 3. a power offset; 4. a signal amplitude coefficient for DPDCH (or a gain factor); 5. a timing or period; 6. a power margin; 7. an index of various formats; 8. a combination of some formats; 9. a change in the number of various formats can be applied to the scheduling, etc. In this case, an overhead of communications due to a required bit number and so on are taken into consideration. The details of the expression forms are defined by the written standard TS25.214 and so on. In this embodiment 1, a maximum allowable transmission rate is used as the format of the scheduling result, and is notified to the mobile station 102.

Next, in step ST203, the scheduling result information (Scheinfo) is notified from the base station 103 to the mobile station 102 via the downlink E-DPCCH 111.

The transmitting operation of the base station 103 in step ST203 will be explained.

First, the maximum allowable transmission rate information which is the scheduling result information is outputted, as E-DPCCH 111 data, from the MAC-e unit 1220 to the multiplexing unit 1704. The E-DPCCH, DCH, and DPCCH data are multiplexed by the multiplexing unit 1704 using a known technique, and are further transmitted by radio via the modulating unit 1705, transmitting unit 1706, and antenna 1205.

At this time, there may be no DCH (or DPDCH) data which should be transmitted actually. For example, there can be a case in which there is no service data (TXdata) which should be transmitted from the base station 103 at the time when the communication service is started, and a case in which only a notification of the scheduling result is carried out.

Next, the receiving operation of the mobile station 102 in step ST203 will be explained.

The downlink E-DPCCH 111 data received by the antenna 205 are processed by the receiving unit 701, demodulating unit 702, and demultiplexing unit 703, and are then inputted to the MAC-e unit 605 as the scheduling result information (E-DPCCH data).

Next, in step ST204, the mobile station 102 transmits packet data via the DPDCH(E-DCH)/DPCCH(E-DCH) 110 on the basis of the scheduling result information notified thereto from the base station 103.

The transmitting operation of the mobile station 102 in step ST204 will be explained.

The MAC-e unit 605 determines the amount of transmission data which the mobile station can transmit (or the transmission rate at which the mobile station can transmit packet data) within the limit of the maximum allowable transmission rate which is notified thereto from the base station 103, and outputs yet-to-be-transmitted data to the buffer 604b for E-DCH as E-DCH data. At this time, the MAC-e unit 605 controls the output timing, i.e., the transmission timing at which the mobile station 102 transmits packet data. The control of the transmission timing can be carried out using any of the following methods: 1. a method of controlling the transmission timing on the basis of the scheduling performed by the base station 103 (Time&Rate control); 2. a method of controlling the transmission timing on the basis of autonomous transmission by the mobile station 102 (Autonomous control); and 3. a method of controlling the transmission timing on the basis of probability (Persistence control), etc., and the control of the transmission timing depends on the scheduling method which the MAC-e unit 605 uses. The control operation will be defined by, for example, the written standard TS25.214.

The E-DCH data stored in the buffer 604b for E-DCH is outputted to the multiplexing unit 704, and is multiplexed with data associated with other channels. The multiplexing unit 704 determines the modulating method etc. based on the amount of the inputted E-DCH data, and outputs information about them to the modulating unit 705 as DPCCH (E-DCH) data. The determination of the modulating method can be carried out by the MAC-e unit 605, and depends on how the mobile station 102 is implemented. In the case in which the MAC-e unit 605 determines the modulating method, the scheduling information is sent, as primitive (not shown), from the media access control unit 203 to the physical layer control unit 204.

Each channel data multiplexed by the multiplexing unit 704 is processed by the modulating unit 705 and transmitting unit 706 using a known technique, and is transmitted by radio, as radio transmission data (Data), from the antenna 205 to the base station 103 via the DPDCH (E-DCH) 110. The report information (TRbuffer) is included in the radio transmission data (Data) transmitted to the base station.

In this embodiment 1, the report information (TRbuffer) is transmitted to the base station in step ST201. As an alternative, when transmitting packet data in step ST204, the report information (TRbuffer) can also be transmitted simultaneously.

The receiving operation of the base station 103 in step ST204 will be explained.

The radio transmission data (Data) received via the antenna 1205 is processed by the receiving unit 1701, demodulating unit 1702, and demultiplexing unit 1703 using a known technique, and is demodulated and demultiplexed into data associated with channels. The demultiplexing unit 1703 judges whether it has received E-DCH data correctly. When the reception judgment result indicates O.K., the demultiplexing unit sends an ACK signal to the MAC-e unit 1220, and also outputs the received upper layer data to the buffer 1601b for E-DCH as E-DCH data. The E-DCH data inputted to the buffer 1601b for E-DCH is sent to the upper layer block 1201 after being processed by each component of the radio link control unit 1202. In contrast, when the reception judgment result indicates NG, the demultiplexing unit sends a NACK signal the MAC-e unit 1220 and cancels the received data. When the reception judgment result indicates NG, it is also possible for the base station to wait for retransmission of the data from the mobile station 102 and to combine the previously-received data and the data retransmitted thereto. In this case, the previously-received data are held temporarily.

Next, in step ST205, the reception judgment result (ACK/NACK) from the base station 103 to the mobile station 102 is notified to the mobile station 102 via the downlink E-DPCCH 111.

The transmitting operation of the base station 103 in step ST205 will be explained.

The reception judgment result (ACK/NACK) is outputted from the MAC-e unit 1220 to the multiplexing unit 1704 as E-DPCCH data. After that, the reception judgment result is processed by the multiplexing unit 1704, modulating unit 1705, and transmitting unit 1706 using a known technique, and is then transmitted by radio as downlink E-DPCCH 111 data. After the multiplexing is performed, the processing is carried out as in the case of step ST203.

Next, the receiving operation of the mobile station 102 in step ST205 will be explained.

The E-DPCCH 111 data received by the antenna 205 is processed by the receiving unit 701, demodulating unit 702, and demultiplexing unit 703 using a known technique, and is then inputted to the MAC-e unit 605 as E-DPCCH data.

The MAC-e unit 605 analyzes the reception judgment result (ACK/NACK) included in the E-DPCCH data, and determines whether to retransmit the packet data or transmit new data (retransmission control). The MAC-e unit 605 outputs the E-DCH data to the buffer 604b for E-DCH.

The buffer 604b for E-DCH transmits the E-DCH data to the base station 103 as radio transmission data (Data) via the multiplexing unit 704, modulating unit 705, transmitting unit 706, and antenna 205. That is, the mobile station shifts to step ST204. The operation of the MAC-e unit 605 at the time of the retransmission control will be explained below.

As mentioned above, the base station 103 carries out the scheduling for packet data transmission via the uplink on the basis of the report information (TRbuffer) transmitted from the mobile station 102 directly to the base station 103.

In this embodiment 1, among the series of steps (steps ST200 to ST205) required to transmit packet data from the mobile station 102, the cycle for scheduling which consists of steps ST203 and ST201 and the cycle for packet data transmission which consists of steps ST204 and ST205 are carried out continuously. As an alternative, the two cycles can be carried out independently.

The amount-of-data measuring step ST200 in the mobile station 102 can also be carried out in a different cycle from the series of cycles. In this case, the report information (TRbuffer) at the time before step ST201 is started can be used when the scheduling is carried out.

Next, the retransmission control processing carried out by the MAC-e unit 605 of the mobile station 102 will be explained.

Figure 13:
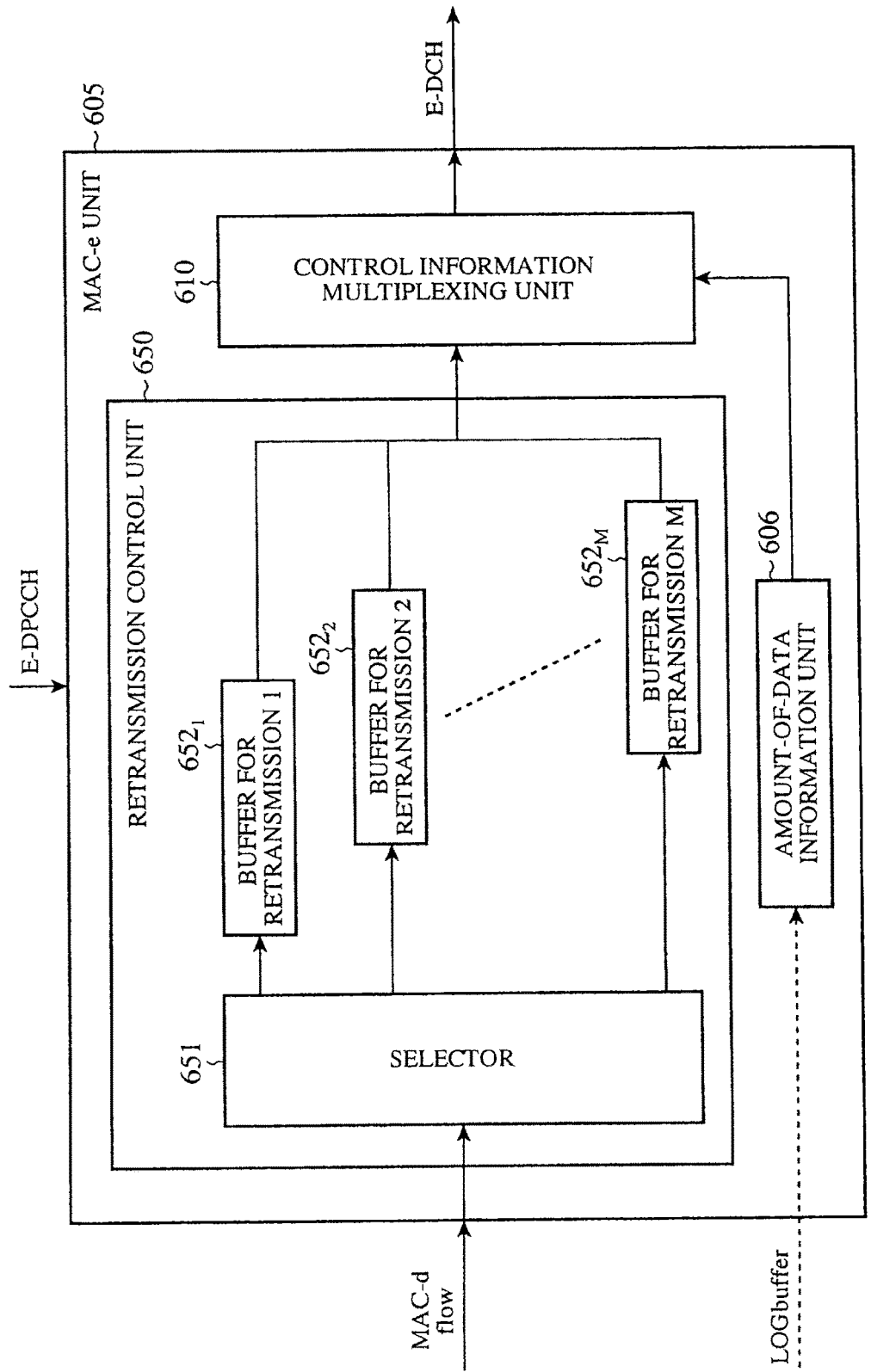
FIG. 13 is a block diagram showing the structure of a MAC-e unit of the mobile station in accordance with embodiment 1 of the present invention.

FIG. 13 is a diagram showing the structure of the MAC-e unit 605 which is related to the retransmission control. As shown in the figure, the MAC-e unit 605 is provided with a retransmission control unit 650, and the retransmission control unit 650 includes a selector 651 and buffers 6521 to 652M for retransmission.

Any of various known techniques can be applied as a retransmission control method which the mobile station 102 uses. In this embodiment 1, the mobile station carries out the retransmission control by means of a channel parallel connection type Stop&Wait method (referred to as an M-channel Stop&Wait method from here on) which is disclosed by release 5 of the written standard. According to this method, M individual retransmission cycles are carried out using a time multiplexing technique.

The MAC-d flow data inputted to the MAC-e unit 605 (MAC-e SDU) is stored in one of the buffers 6521, 6522, . . . , and 652M for retransmission by the selector 651 of the retransmission control unit 650 on the basis of a quality request (QoS) to the data service, the priorities of the logical channels, or the like. The selector 651 adds an index (QueueID:1 to M) to the head of the inputted MAC-d flow data (MAC-e SDU) in order to distinguish among the buffers for retransmission.

According to the transmission timing control by the MAC-e unit 605, one buffer is selected from among the buffers 6521, 6522, . . . , and 652M for retransmission, and the stored data is outputted to the control information multiplexing unit 610.

The data inputted to the control information multiplexing unit 610 is multiplexed by the control information multiplexing unit 610 with the report information (TRbuffer), and is then outputted to the buffer 604b for E-DCH as E-DCH data (MAC-e PDU). Subsequent processing is the same as that of step ST204 of FIG. 12.

Figure 14:
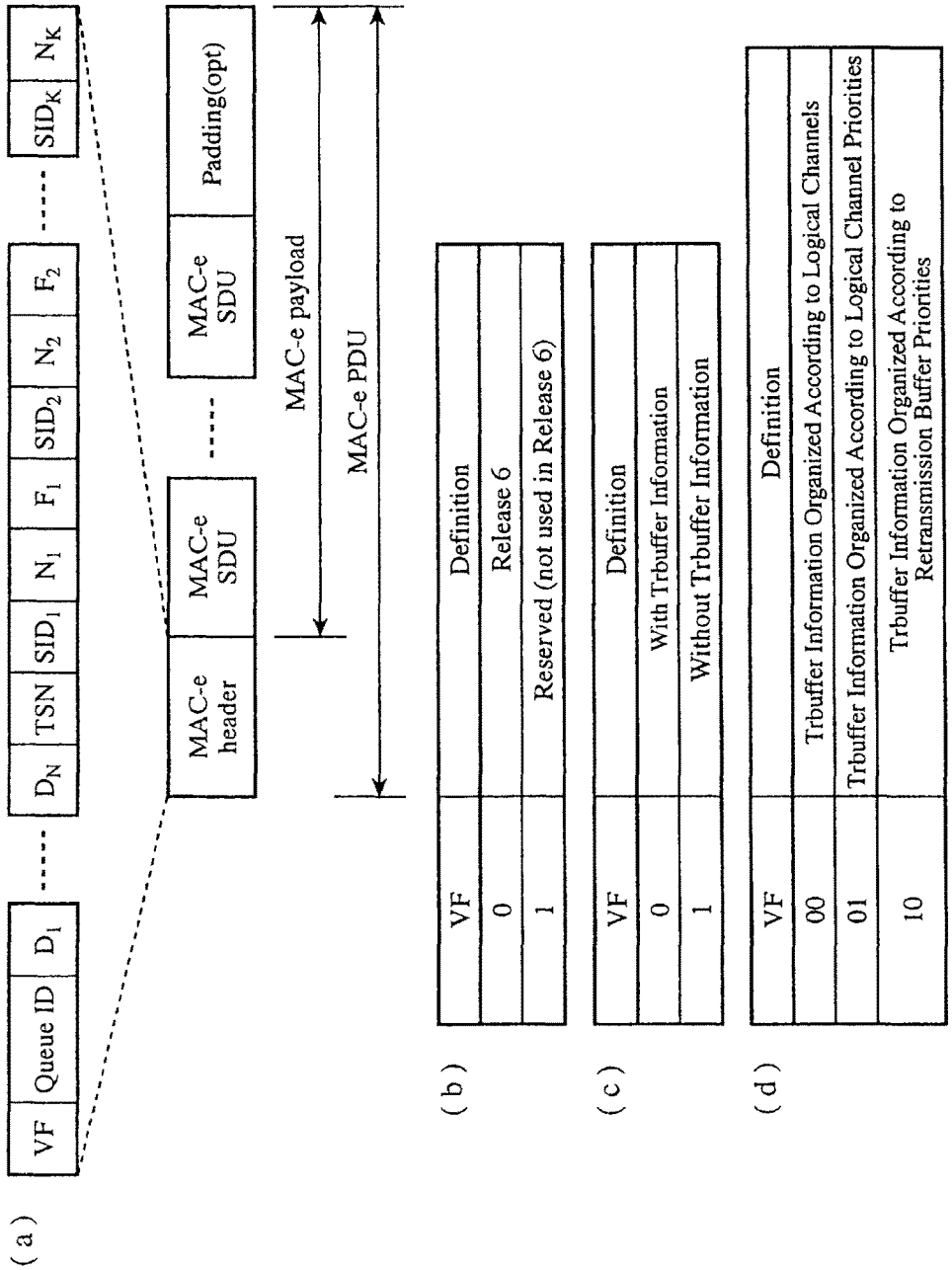
FIG. 14 is a diagram showing the format of MAC-e PDU in accordance with embodiment 1 of the present invention.

FIG. 14 is a diagram showing the format of the MAC-e PDU outputted from the MAC-e unit 605 in accordance with embodiment 1. In the figure, (a) shows the format of the MAC-e PDU, and (b), (c), and (d) show examples of a VF value which is an identifier at the time of using this format, and the definition of the VF value.

QueueID is the index of one of the buffers 6521 to 652M for retransmission. D1 to DN are report information (TRbuffer) regions. N is the number of the logical channels, and pieces of report information about the logical channels can be carried by D1 to DN, respectively. As the value of N, the number M of the buffers for retransmission can be used, or a part of the M pieces of information can be alternatively used and assigned. In a case when a part of the M pieces of information is used, when data are actually transmitted from a transmit buffer for each logical channel, the amount-of-data information about the buffer can be carried by a report information region. TSN (Transmission Sequence Number) is a sequence number to correctly rearrange data in turn and to output them from the lower layer to the upper layer at the time of reception in the base station 103. SID(Size ID)1 to SIDk are indexes each indicating the length of a plurality of MAC-e SDUs with an identical bit number when transmitting them at a time. N1 to Nk are numbers each indicating how many MAC-e SDUs of the same SID are running contiguously. F1 to Fk−1 are flags each indicating that the MAC-e header (MAC-e header) continues. Padding is a bit which is added in order to make the length of the MAC-e PDU be equal to an integral multiple of 8 bits. opt shows optional specifications. In the MAC-e, the whole of MAC-e SDU is called MAC-e payload.

As shown in the figure, the plurality of report information regions D1 to DN are multiplexed into the header area (MAC-e header) of the MCA-e PDU. The format of the MAC-e PDU and the definition of the parameters are defined by the written standard TS25.321, but the order of the fields of the MAC-e header is not limited to the example shown in the figure.

The following method of using the VF value can provided, for example.

In the example shown in (b) of the figure, a case in which VF is used as an identifier indicating the version of the release of the written standard is shown. Because this example can support any future change in the format, while backward compatibility (Backward compatibility) can be ensured even when a base station 103 which complies with only a release of the written standard in which E-DCH is newly added, and another base station 103 which complies with a subsequent release coexist in the communications system, the example can also support a future extension to the standard.

The example shown in (c) shows a case in which VF is used as an identifier indicating whether the report information (TRbuffer) is multiplexed into the MAC-e PDU. In this example, in a case in which there is no large change in the amount of data of the transmit buffer and new report information (TRbuffer) is not transmitted to the base station 103, the length of the MAC-e PDU can be varied and the number of transmission bits can be shortened. As a result, the communication overhead produced in the communication cycle for the scheduling can be reduced, and the interference of communications in the uplink can be reduced.

The example shown in (d) shows a case in which the VF value is expressed as a number of two or more bits, and is used as an identifier indicating the description of the report information (TRbuffer). For example, in this embodiment 1, because information about the amounts of data organized according to logical channels currently assigned to the E-DCH is transmitted to the base station 103, VF=00 is used. In this example, because a plurality of kinds of descriptions of the report information (TRbuffer) can be provided, a kind of report information which is the most effective for the communications system, which a carrier or a base station manufacturer employs, can be used.

Furthermore, by dividing the bits representing VF into parts and using these parts, it is also possible to provide an identifier which is a combination of the above-mentioned examples (b), (c), and (d).

Figure 15:
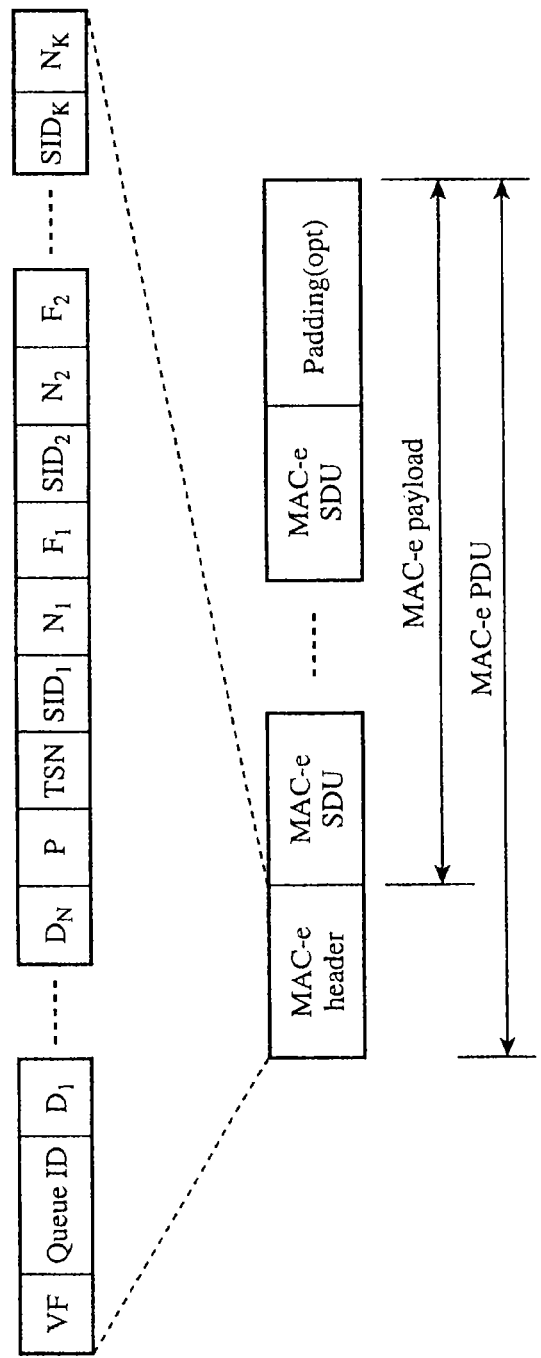
FIG. 15 is a diagram showing a variant of the format of MAC-e PDU in accordance with embodiment 1 of the present invention.

FIG. 15 is a diagram showing another example of the format of the MAC-e PDU.

This format differs from the format shown in FIG. 14 in that a parameter P is added to the tail end of the report information (TRbuffer). In this embodiment 1, the parameter P indicates a total transmission power value (an absolute value) of the mobile station. As an alternative, a power value (an absolute value) of the DPCCH 106 can be used instead of the total transmission power value (an absolute value). Because the base station 103 can measure a quantity showing an uplink communication environment (for example, a propagation attenuation: Path Loss) by using this format, the base station can carry out the scheduling more efficiently by using the information for the scheduling.

The value of the parameter P can show another status measurement parameter of the mobile station 102 which is described in relation to step ST200 of FIG. 12. The use of two or more pieces of mobile station information at the time when the base station 103 performs the scheduling operation makes it possible to make the scheduling more effective. As an alternative, the format with the parameter P and another format without the parameter P can be transmitted at different report timings. In a case of, for example, notifying power information to a base station 103 which can use only a format without the parameter P, a report information region D is used and transmitted instead of the amount-of-data information. The status information about the power is measured by the physical layer control unit 204, is notified to the MAC-e unit 605 in the form of control information (PHYcont and MACcont) or primitive, and is transmitted to the base station 103 after being processed by the physical layer control unit 204.

In FIGS. 14 and 15, the order and positions of the plurality of report information regions D1 to DN and power information region P are not limited to the example shown. However, because they can be processed collectively by the MAC-e unit 605 by making them be adjacent to one anther, the structure of the processing apparatus can be simplified.

In FIGS. 14 and 15, when error correction processing is performed on the whole or a part of the MAC-e header (for example, the report information regions D1 to DN and power information region P), transmission errors can be reduced.

Furthermore, because the mobile station 102 can be identified by the base station 103 by forming a mobile station identification information (UE ID) field in the MAC-e header or incorporating the mobile station identification information (UE ID) into the whole or a part of the MAC-e header, transmission of data from the mobile station 102 can be carried out on a common link, and more efficient utilization of the radio resource can be carried out.

In addition, when the length of the MAC-e PDU is made variable, it is not necessary to add the overhead bit (Padding) to the tail end of the MAC-e PDU. Because a DSP, a gate array, etc. are used to give a higher priority to an improvement in the processing speed when the media access control unit 203 is implemented, the amount of processing of the mobile station 102 can be reduced by shortening the length of the MAC-e PDU.

Furthermore, the length of the MAC-e PDU is made variable, and, when the logical channels which are reported as report information are few in number, the length of each of the report information regions D1 to DN can be shortened. In this case, an identification number (expressed as C/T in the written standard) identifying a logical channel can be added to each of the report information regions D1 to DN.

As mentioned above, in accordance with embodiment 1, because yet-to-be-transmitted data information of the mobile station 102 is multiplexed, as report information (TRbuffer), into the MAC-e header of MAC-e PDU and is transmitted to the base station 103, a high-speed notification of the yet-to-be-transmitted data amount information from the mobile station 102 to the base station 103 can be carried out. As a result, because the uplink radio resource control (scheduling) can be carried out in the base station 103 and higher-speed control can be carried out as compared with the radio resource control by the base station control apparatus 104, the efficiency of the communications system is further improved and the throughput of the whole cell is improved.

Furthermore, because the yet-to-be-transmitted data information as status information of the mobile station 102 is directly transmitted to the base station 103 without being via the base station control apparatus 104, high-speed high-frequency transmission can be carried out, and the efficiency of the uplink radio resource control by the base station 103 is further improved and the throughput of the whole cell is improved.

The need for the transfer of the amount-of-data information from the base station control apparatus 104 to the base station 103 can be eliminated, and the traffic from the base station control apparatus 104 to the base station 103 can be reduced.

Furthermore, because the report information is multiplexed with upper layer data (MAC-e SDU) and transmitted via DPDCH, it is not necessary to ensure a dedicated channel (code for channel separation) in order to notify the status information about the status of the mobile station 102 to the base station 103. When two or more channels are transmitted in parallel using many spread codes, the peak/average of the radio frequency signal (PAR: Peak to Average Ratio) can be reduced. Therefore, the securing of the linearity in the transmitter characteristics of the mobile station 102 can be eased, and therefore long-time transmission can be carried out.

In addition, because the information about the amounts of data organized according to logical channels is notified to the base station 103, the base station 103 which holds the logical channel information about all mobile stations can control transmission between mobile stations in consideration of a priority assigned to the transmission between the mobile stations. As a result, the uplink scheduling can be carried out more efficiently.

In this embodiment 1, the generation of the amount-of-data report (Traffic Report) notified to base station control apparatus 104 and the generation of the report information (TRbuffer) to the base station 103 are carried out by different processing blocks, respectively. As an alternative, they can be carried out by a single block. For example, an extension of a Traffic volume measurement block which complies with the standard specifications can be considered as such a single block.

Furthermore, DCH related information, such as DCH amount-of-data information (DCH LOGbuffer) from the radio link control unit 202, DCH transmission rate information, and logical channel priority information about DCH data, can also be transmitted as the report information (TRbuffer). In this case, because the amount of transmission data via DCH can be grasped even by the base station 103, the amount of interference by DCH can be taken into consideration when the scheduling for E-DCH is carried out by the base station 103, and more efficient control of the communications system can be carried out if it is done in cooperation with the low-speed control of both channels (DCH and E-DCH) in the base station control apparatus 104. In particular, this is effective for a case in which the transmission control of the DCH transmission and E-DCH transmission is carried out independently and their priorities differ.

Embodiment 2

The structures of a mobile station and a base station side in accordance with embodiment 2 are the same as those of embodiment 1.

Figure 16:
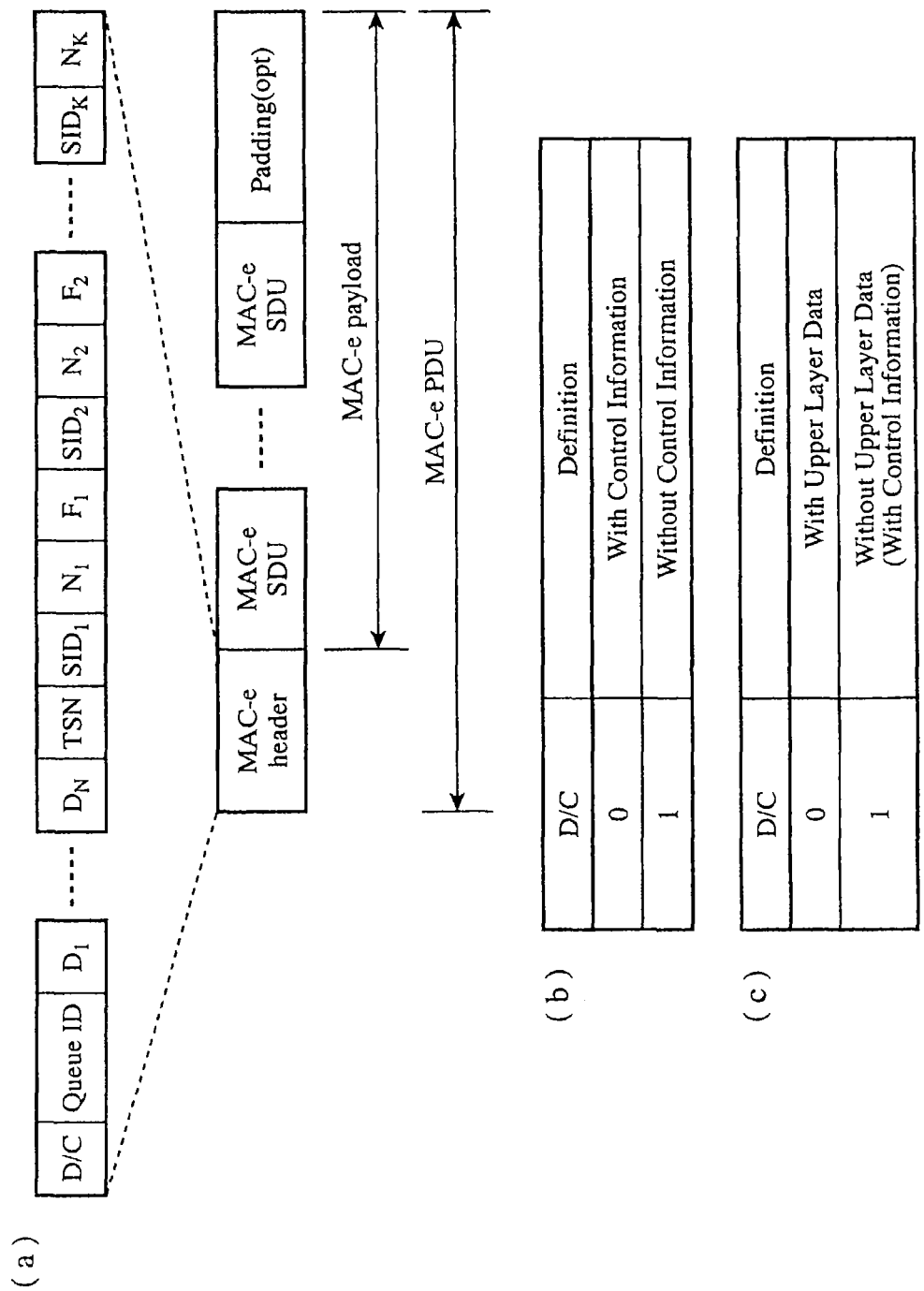
FIG. 16 is a diagram showing the format of MAC-e PDU in accordance with embodiment 2 of the present invention.

FIG. 16 is a diagram showing the format of MAC-e PDU in accordance with embodiment 2. In the figure, (a) shows the format of the MAC-e PDU, and (b) and (c) show examples of the definition of a parameter D/C. Also in this embodiment 2, report information (TRbuffer) is multiplexed into a MAC-e header. D/C is a flag showing whether only data is transmitted or control information is also transmitted in addition to data. The other parameters are the same as those of embodiment 1. There can be a case in which no MAC-e payload is transmitted. In this case, SID1 and N1 are set to zero, and only various pieces of control information for the scheduling by the base station, including the report information (TRbuffer), is transmitted as the MAC-e PDU.

In the example shown in (b), the parameter D/C is used in order to show the presence or absence of information, such as report information regions D1 to DN, for radio resource control in the base station 103. D/C=0 shows that there is control information in the base station, and D/C=1 shows that there is no control information in the base station. By definitely placing the D/C flag at the beginning of the MAC-e header, the base station 103 can recognize the presence or absence of the control information, such as the report information (TRbuffer), when starting receiving packet data. Because packet data is produced bursty and the base station 103 can grasp the amount of packet data received thereby, the transmission frequency can be reduced by transmitting the report information only when each burst of packet data is produced. As a result, the occurrence of uplink interference can be suppressed, and the resource can be assigned to other mobile stations 102.

In the example shown in (c), D/C=0 shows a case in which there is upper layer data (MAC-e SDU), and D/C=1 shows a case in which is there is no upper layer data. In this case, control information, such as report information (TRbuffer), is transmitted by default at the time of transmission of every MAC-e PDU. Therefore, when the communication overhead caused by the report information regions (D1 to DN) is small, the status information about the status of the mobile station 102 can be notified to the base station 103 with high frequency, and the base station 103 can perform the scheduling more effectively.

As mentioned above, in accordance with embodiment 2, because yet-to-be-transmitted data information of the mobile station 102 is multiplexed, as report information (TRbuffer), into the MAC-e header of MAC-e PDU and is transmitted to the base station 103, a high-speed notification of the yet-to-be-transmitted data amount information from the mobile station 102 to the base station 103 can be carried out. As a result, because the uplink radio resource control (scheduling) can be carried out in the base station 103 and higher-speed control can be carried out as compared with the radio resource control by the base station control apparatus 104, the efficiency of the communications system is further improved and the throughput of the whole cell is improved.

Furthermore, because the yet-to-be-transmitted data information is directly transmitted to the base station 103 without being via the base station control apparatus 104, high-speed high-frequency transmission can be carried out, and the efficiency of the uplink radio resource control by the base station 103 is further improved and the throughput of the whole cell is improved.

In addition, by disposing the D/C parameter in the MAC-e header of the MAC-e PDU, the format length of the MAC-e PDU can be shortened and therefore the communication overhead can be reduced when there is no upper layer data.

In this embodiment 2, the report information regions (D1 to DN) are placed in the MAC-e header. Because the base station 103 can recognize the existence of the control information, such as the report information (TRbuffer), using the D/C parameter when starting receiving packet data, it is possible to arrange the report information regions (D1 to DN) behind MAC-e SDU, and in this case it is not necessary to provide Padding.

As in the case of embodiment 1, DCH related information, such as amount-of-data information (DCH LOGbuffer) from the radio link control unit 202, DCH can also be transmitted as the report information (TRbuffer). In this case, because the amount of transmission data via DCH can be grasped even by the base station 103, the amount of interference by DCH can be taken into consideration when the scheduling for E-DCH is carried out by the base station 103, and more efficient control of the communications system can be carried out if it is done in cooperation with the control of both the low-speed channels (DCH and E-DCH) in the base station control apparatus 104.

Embodiment 3

The structures of a mobile station and a base station side in accordance with embodiment 3 are the same as those of embodiment 1.

Figure 17:
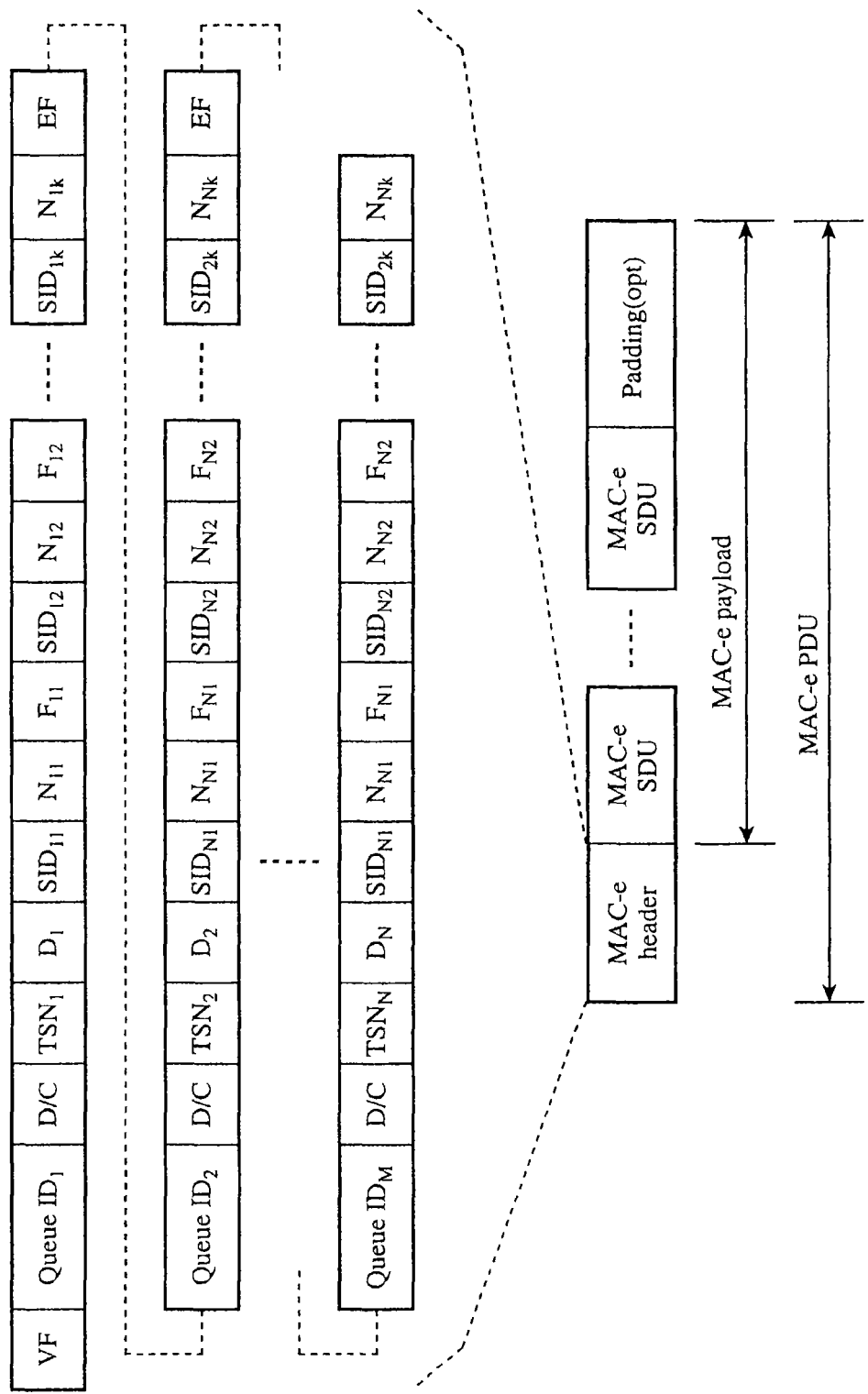
FIG. 17 is a diagram showing the format of MAC-e PDU in accordance with embodiment 3 of the present invention.

FIG. 17 is a diagram showing the format of MAC-e PDU in accordance with embodiment 3. Also in this embodiment 3, report information (TRbuffer) is multiplexed into a MAC-e header.

In the figure, EF is a flag indicating that a combination of parameters including QueueID to N placed before EF is repeated behind EF. The other parameters are the same as those of embodiments 1 and 2.

In embodiment 3, the amounts of data organized according to buffers for retransmission shown by QueueID1 to QueueIDM, as well as the amounts of data organized according to logical channels, are notified to the base station 103.

As shown in the figure, by combining amount-of-data information and pieces of MAC-e SDU data information (SID, N, and F) to be transmitted and multiplexing them into the header for each buffer for retransmission, the need for providing different buffer IDs to the amount-of-data information and MAC-e SDU data is eliminated.

Furthermore, because data stored in a plurality of buffers for retransmission having different priorities can be multiplexed into the same MAC-e PDU and can be transmitted at a time by carrying a plurality of buffer IDs in the MAC-e PDU, the data stored in each buffer for retransmission can be transmitted efficiently in a case in which the amount of data stored in each buffer is small.

As mentioned above, in accordance with embodiment 3, because yet-to-be-transmitted data information of the mobile station 102 is multiplexed, as report information (TRbuffer), into the MAC-e header of MAC-e PDU and is transmitted to the base station 103, a high-speed notification of the yet-to-be-transmitted data amount information from the mobile station 102 to the base station 103 can be carried out. As a result, because the uplink radio resource control (scheduling) can be carried out in the base station 103 and higher-speed control can be carried out as compared with the radio resource control by the base station control apparatus 104, the efficiency of the communications system is further improved and the throughput of the whole cell is improved.

Furthermore, because the yet-to-be-transmitted data information is directly transmitted to the base station 103 without being via the base station control apparatus 104, high-speed high-frequency transmission can be carried out, and the efficiency of the uplink radio resource control by the base station 103 is further improved and the throughput of the whole cell is improved.

Because the mobile station 102 transmits the report information for each buffer for retransmission to the base station 103, the base station 103 can carry out the scheduling in consideration of the priority assigned to the yet-to-be-transmitted data of each mobile station 102 and can therefore carry out radio resource management more efficiently. Because report information about logical channels having the same priority is stored in the same buffer for retransmission, the provision of the information about the amounts of data organized according to buffers for retransmission can reduce the bit number required for the report information and can also reduce the amount of uplink interference.

In accordance with this embodiment 3, the report information for each buffer for retransmission which is used for E-DCH is transmitted. However, amount-of-data information (DCH LOGbuffer) from the radio link control unit 202 can also be transmitted as the report information. In this case, a part of the MAC-e PDU can be so constructed as to have a format according to embodiment 1 or 2. As a result, because the amount of transmission data via DCH can be grasped even by the base station 103, the amount of interference by DCH can be taken into consideration when the scheduling for E-DCH is carried out by the base station 103, and more efficient control of the communications system can be carried out if it is done in cooperation with the low-speed control of both channels (DCH and E-DCH) in the base station control apparatus 104.

Embodiment 4

The structures of a mobile station and a base station side in accordance with embodiment 4 are the same as those of embodiment 1.

FIG. 18 is a diagram showing the format of MAC-e PDU in accordance with embodiment 4. In the figure, (a) shows the format of the MAC-e PDU, and (b) shows an example of the definition of a parameter PDU type. The format of the MAC-e PDU in accordance with embodiment 4 is intended for communications between MAC-es for transmitting control information, such as report information (TRbuffer). This format is also applicable to a notification of control information from the base station 103 to the mobile station 102, and so on, and can be used for not only a report about the amount-of-data information but also for general purposes.

The parameter PDU type is a parameter used for distinguishing the format (type) of the MAC-e PDU. The other parameters are the same as those of embodiment 1. As shown in FIG. 16 of embodiment 2, the D/C parameter is set to a value indicating that control information is included.

The MAC-e PDU format in accordance with the embodiment 4 is the same as that of STATUS PDU which is one of RLC PDU formats according to the conventional standard.

As shown in the figure (b), in accordance with embodiment 4, three bits are used for a region of PDU type.

PDU type=000 shows a case where the MAC-e PDU includes status information (STATUS) about the status of the mobile station 102 which is notified from the mobile station 102 directly to the base station 103, in addition to the report information (TRbuffer). For example, in a case in which data is transmitted from an external device (TE: Terminal Equipment) connected to the mobile station 102 to an external network, it is possible that the mobile station 102 acquires status information about the status of the external device (TE) in order to carry out transmission control (what is called flow control), and notifies the status information to the base station 103.

PDU type=001 is used for a case in which a reception destination initializes status information about the status of a transmission source. In this case, the format can also be used for a notification from the base station 103 to the mobile station 102, as well as for a notification from the mobile station 102 to the base station 103. Because a method of making a notification from the base station 103 to the mobile station 102 is implemented by interchanging the operation of the base station 103 with that of the mobile station 102, the explanation of the method will be omitted hereafter.

PDU type=010 is used for a case of making a notification (RESET ACK) showing that reset is completed in response to a reset request. Also in this case, the format can also be used for a notification from the base station 103 to the mobile station 102, as well as for a notification from the mobile station 102 to the base station 103.

PDU type=011 is used for a case of transmitting status information (MAC-e STATUS) about the status of the mobile station 102. In this case, the status information is notified from the mobile station 102 to the base station 103.

Another PDU type value shows that it is not used (Reserve) in a release in which E-DCH is introduced, for example.

The transmission of the MAC-e PDU in accordance with this embodiment 4 is made a higher priority than the transmission of those according to embodiments 1 to 3.

As mentioned above, in accordance with embodiment 4, because yet-to-be-transmitted data information of the mobile station 102 is multiplexed, as report information (TRbuffer), into the MAC-e header of MAC-e PDU and is transmitted to the base station 103, a high-speed notification of the yet-to-be-transmitted data amount information from the mobile station 102 to the base station 103 can be carried out. As a result, because the uplink radio resource control (scheduling) can be carried out in the base station 103 and higher-speed control can be carried out as compared with the radio resource control by the base station control apparatus 104, the efficiency of the communications system is further improved and the throughput of the whole cell is improved.

Furthermore, because the yet-to-be-transmitted data information is directly transmitted to the base station 103 without being via the base station control apparatus 104, high-speed high-frequency transmission can be carried out, and the efficiency of the uplink radio resource control by the base station 103 is further improved and the throughput of the whole cell is improved.

In addition, because the use of the PDU type parameter makes it possible to notify not only the report information (TRbuffer) about the mobile station 102 but also various pieces of status information and control information about the mobile station 102, more efficient uplink control can be carried out.

Because the MAC-e PDU format in accordance with embodiment 4 is the same as the format of STATUS PDU which is one of RLC PDU formats according to the conventional standard, it is not necessary to define independently a format for use in the radio link control unit 202 and a format for use in the media access control unit 203. For this reason, because a PDU generation processing circuit and so on can be shared, the structure of the mobile station can be simplified.

According to embodiment 4, pieces of information (STATUS, RESET, and RESET ACK) for use in the radio link control unit 202 can also be notified to the base station 103, as well as to the base station control apparatus 104. As a result, because the information which the base station control apparatus 104 uses can also be used for the radio resource control by the base station 103, the scheduling can be carried out more effectively.

In accordance with this embodiment 4, the format intended for the control information is defined. However, it is also possible to transmit the data (MAC-e SDU) instead of the report information (D1 to DN) in the same format by definitely setting the D/C parameter to a value indicating that it is data information.

Furthermore, in accordance with embodiment 4, while the report information (D1 to DN) and other mobile station status information are distinguished with PDU type, as previously mentioned, a further difference can be introduced.

Embodiment 5

The structures of a mobile station and a base station side in accordance with embodiment 5 are the same as those of embodiment 1.

FIG. 19 is a diagram showing the format of MAC-e PDU in accordance with embodiment 5. In the figure, (a) shows the format of the MAC-e PDU, and (b) shows the format of piggyback PDU. In this embodiment 5, the piggyback PDU, as well as Padding (opt), is added to the tail end of the MAC-e PDU.

In the figure (b), R2 is a substitute for the D/C parameter in the MAC-e PDU, and is not used in this embodiment 5. The other parameters are the same as those of embodiment 4.

In a case of adding a report information field to data (MAC-e SDU) and transmitting this data, the D/C parameter of the MAC-e PDU is set to "with control information", as shown in FIG. 16 of embodiment 2. Simultaneously, as shown in FIG. 18 of embodiment 4, 011 is used as the PDU type parameter, and, when receiving MAC-e PDU having another value, the base station 103 determines that its piggyback PDU is invalid, and discards the MAC-e PDU.

The transmission of MAC-e PDU to which piggyback PDU in accordance with this embodiment 5 is added is made a higher priority than that of MAC-e PDU having only data to be transmitted. In this case, MAC-e PDU can be transmitted without MAC-e SDU.

As mentioned above, in accordance with embodiment 5, because yet-to-be-transmitted data information of the mobile station 102 is multiplexed, as report information (TRbuffer), into the MAC-e header of MAC-e PDU and is transmitted to the base station 103, a high-speed notification of the yet-to-be-transmitted data amount information from the mobile station 102 to the base station 103 can be carried out. As a result, because the uplink radio resource control (scheduling) can be carried out in the base station 103 and higher-speed control can be carried out as compared with the radio resource control by the base station control apparatus 104, the efficiency of the communications system is further improved and the throughput of the whole cell is improved.

Furthermore, because the yet-to-be-transmitted data information is directly transmitted to the base station 103 without being via the base station control apparatus 104, high-speed high-frequency transmission can be carried out, and the efficiency of the uplink radio resource control by the base station 103 is further improved and the throughput of the whole cell is improved.

In addition, because it is possible to transmit the report information in a dedicated format if needed, a transmission setup different from that for transmission of upper layer data can be performed. Furthermore, because the format intended only for mobile station status information is defined, it is not necessary to define two or more formats as MAC-e PDU and therefore the processing performed by the mobile station 102 and that performed by the base station 103 can be simplified.

In addition, according to the embodiment 5, plural pieces of information (STATUS, RESET, RESET ACK) which the radio link control unit 202 uses can also be used and notified to the base station 103, as well as to the base station control apparatus 104. As a result, the scheduling can be carried out more effectively because these pieces of information can also be used for the radio resource control by the base station 103.

Because the MAC-e PDU format in accordance with embodiment 5 is the same as the format of piggyback PDU which is one of RLC PDU formats according to the conventional standard, it is not necessary to define independently a format for use in the radio link control unit 202 and a format for use in the media access control unit 203. For this reason, because a processing circuit and so on can be shared in view of the implementation of the mobile station 102, the structure of the mobile station can be simplified.

In this embodiment 5, although the PDU type parameter is set to 011, this setting can be selected arbitrarily. The PDU type parameter is not limited to the value of this embodiment when standards are defined.

Furthermore, in this embodiment 5, although data information for each logical channel is used as the report information, data information for each logical channel priority, data information for each buffer for retransmission, other status information about mobile stations, or the like can be used as the report information.

The format of STATUS PDU in accordance with embodiment 4, and that of piggyback PDU in accordance with embodiment 5 can be used not only for a report sent from the mobile station 102 to the base station 103, but also for a notification of the scheduling result sent from the base station 103 to the mobile station 102. In this case, a field in which a transmission specified time, an allowable maximum transmission rate, and so on are written is disposed instead of the field used for notification of the report information, and various pieces of mobile station transmission control information which are disclosed in nonpatent references 1 and 2 can be carried at the time of notification.

Figure 20:
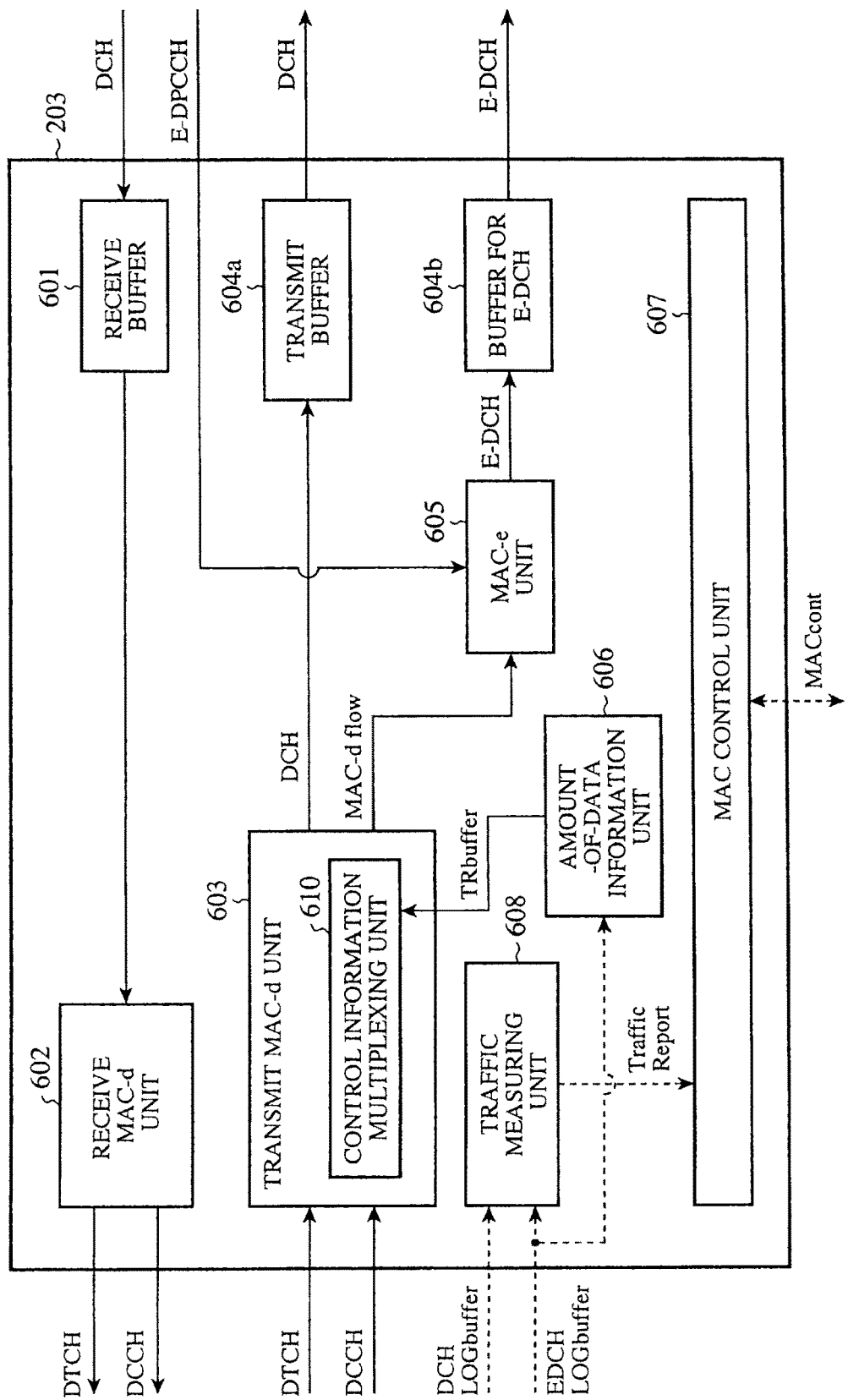
FIG. 20 is a block diagram showing an example of the structure of a media access control unit of a mobile station in accordance with embodiment 5 of the present invention.

In embodiments 4 and 5, it is assumed that data information corresponding to E-DCH is measured by the MAC-e unit 605 and is multiplexed, as a part of the MAC-e header, into MAC-e PDU. As in the case of using the Traffic volume measurement function which complies with the conventional standards, when data information corresponding to E-DCH is measured by the MAC-d unit, it can also be multiplexed as a part of the MAC-d PDU header. In this case, as shown in FIG. 20, the control information multiplexing unit 610 is mounted in the MAC-d unit 603.

Figure 21:
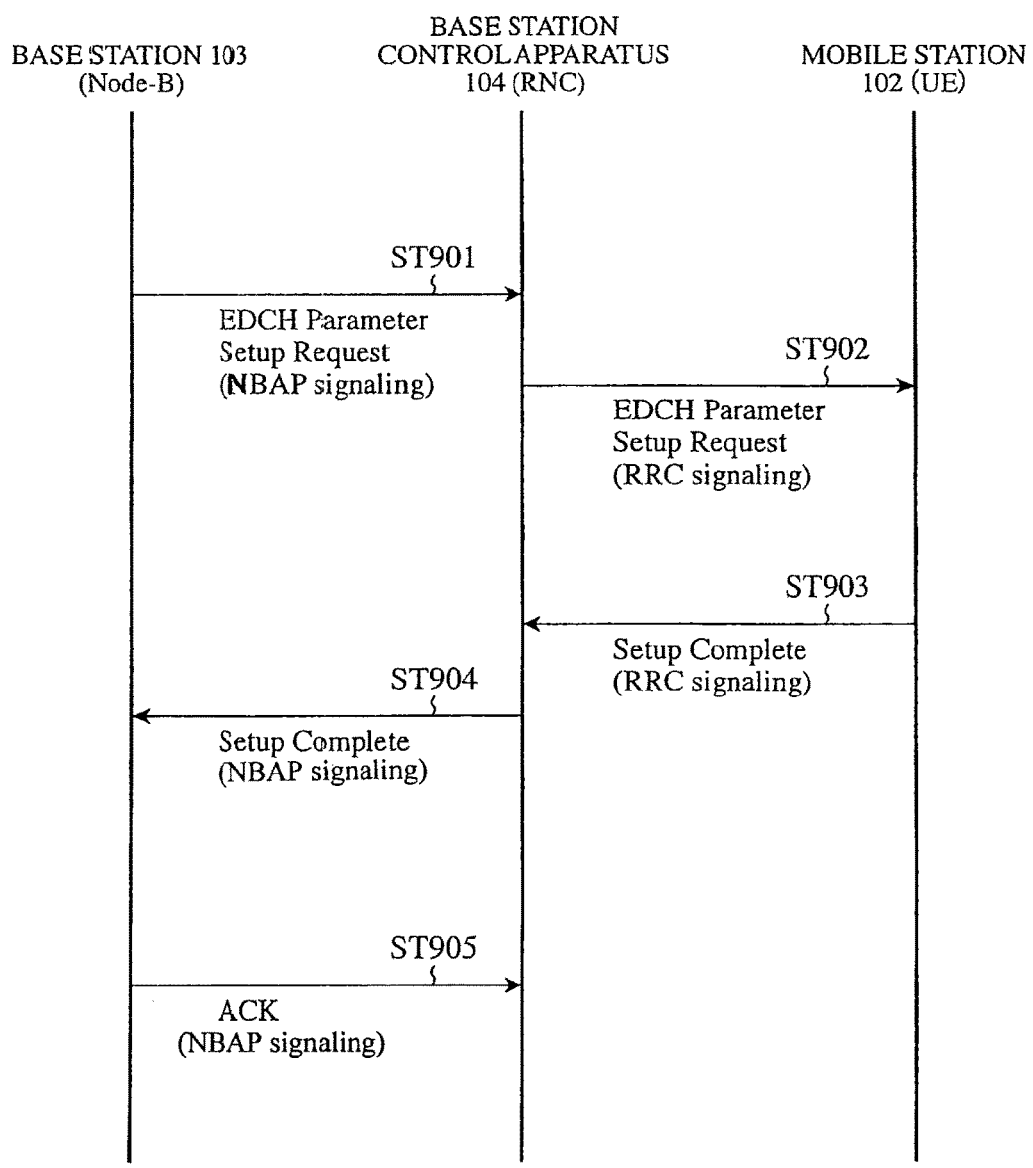
FIG. 21 is a diagram showing a flow of setting of parameters in accordance with embodiments 1 to 5 of the present invention.

FIG. 21 is a diagram showing a flow of a setup of conditions on the measurement of the report information (TRbuffer) or a report about the measurement, the report information being exchanged among the mobile station 102, base station 103, and base station control apparatus 104 in accordance with either of embodiments 1 to 5. These exchange processes are carried out prior to actual data transmission processing for the communication services or at the time of changing the communication service setting in the middle of transmission, and are carried out apart from any actual data transmission.

First, the base station 103 transmits a condition setup request command (EDCH Parameter Setup Request) to the base station control apparatus 104 (in step ST901). At this time, parameters notified to the base station control apparatus include a measurement timing period, and report timing conditions (Periodic or Event trigger, a report threshold, etc.), for example. When restrictions are imposed on DCH with the E-DCH setup, various setup conditions related to DCH can be transmitted together.

In the base station 103, the MAC-e unit 1220 generates a condition setup request, and the media access control unit 1203 outputs the request to the radio resource control unit 1206 of the base station control apparatus 104 as control information (MACcont). An exchange of various types of information between the base station 103 and the base station control apparatus 104 is called NBAP signaling (NBAP signaling), and will be defined by, for example, the written standard TS25.433. The NBAP signaling information is transmitted via cable communications using a cable, such as a coaxial cable.

Next, the base station control apparatus 104 notifies a report condition setup request (EDCH Parameter Setup Request) to the mobile station 102 (in step ST902).

An exchange of various types of information between the mobile station 103 and the base station control apparatus 102 is called RRC signaling (RRC signaling), and will be defined by, for example, the written standard TS25.331.

The operation of the base station side in step ST902 will be explained.

First, the setup request is outputted to the radio link control unit 1202 from the radio resource control unit 1206 as control information (RLCcont). Next, it is outputted from the radio link control unit 1202 to the MAC-d unit 1221 as DCCH data.

In the MAC-d unit 1221, it then becomes DCH data, and is outputted to the physical layer control unit 1204. Next, it becomes DPDCH (DCH) data in the physical layer control unit 1204, and is transmitted by radio from the antenna 1205 to the mobile station 102.

The operation of the mobile station 102 in step ST902 will be explained.

The mobile station 102 receives the radio signal via the antenna 205. After the radio signal is subjected to demodulating and demultiplexing processes by the physical layer control unit 204, the DCCH data is acquired by the MAC-d unit 602 and is outputted to the receive buffer 501*b* of the radio link control unit 202. Next, it is outputted from the receive buffer 501*b* to the radio resource control unit 206 by way of the RLC control unit 503.

Next, the mobile station 102 carries out a setup (Configuration or Reconfiguration) of operating conditions on the basis of the setup information, and, when completing the setup, notifies the completion of the setup to the base station control apparatus 104 (in step ST903).

The operation of the mobile station 102 in step ST903 will be explained.

The radio resource control unit 206 stores the setup information which is requested thereof in the MAC control unit 607 as control information (MACcont). The radio resource control unit also issues an instruction to the MAC-e unit 605 of the media access control unit 203 to carry out a setup of operating conditions.

When grasping that the setup of operating conditions is completed, the MAC control unit 607 notifies the radio resource control unit 206, as control information (MACcont), that it has grasped that the setup of operating conditions is completed.

Next, the radio resource control unit 206 of the mobile station 102 notifies completion information (Setup Complete) indicating that it has incorporated the setup information into the mobile station 102 to the base station control apparatus 104 via the base station 103 using RRC signaling.

Because the other operation of the mobile station is done in reverse order to that of step ST902, the detailed explanation of the other operation will be omitted.

Next, the base station control apparatus 104 notifies the completion information (Setup Complete) indicating that the mobile station 102 has incorporated the setup information thereinto to the base station 103 using NBAP signaling (in step ST904). Because this operation of the base station control apparatus is done in reverse order to that of step ST901, the detailed explanation of the operation will be omitted.

The completion information indicating that the mobile station 102 has incorporated the setup information thereinto is notified from the radio resource control unit 1206 of the base station control apparatus 104 to the radio link control unit 1202 and media access control unit 1203.

Next, the media access control unit 1203 of the base station 103 notifies information (ACK) indicating that the base station 103 has recognized the completion of the setup by the mobile station 102 to the base station control apparatus 104 using NBAP signaling (in step ST905).

Because this operation of the base station is the same as that of step ST901, the detailed explanation of the operation will be omitted.

In accordance with conventional technologies, RRC signaling is transmitted and received using DCCH and DCH. However, when communications using E-DCH are being carried out, RRC signaling can be carries out using E-DCH.

Furthermore, when the condition setup request is notified from the base station control apparatus 104 to the mobile station 102, a CMAC-Measure-REQ command which is a parameter setup command defined by the conventional standards can be extended and used, for example, and a parameter only for E-DCH report condition setup can be added independently.

In this case, the backward compatibility and expandability of the command are ensured by adding a version display parameter (or a flag) showing the version of the standards to the CMAC-Measure-REQ command.

Furthermore, the use of the same command as that according to the conventional standards can simplify the structure of the apparatus.

In the flow shown in FIG. 21, exchanges of information between the mobile station 102 and the base station control apparatus 104 and exchanges of information between the base station 103 and the base station control apparatus 104 can be carried out independently.

Embodiment 6

Figure 22:
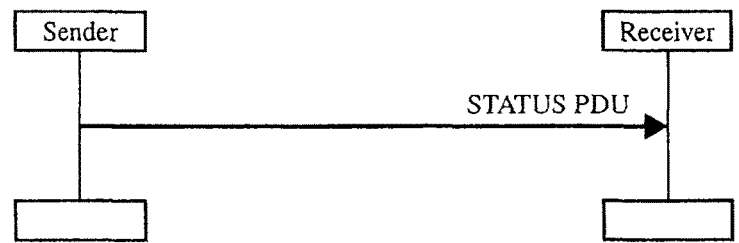
FIG. 22 is q diagram showing a flow of transmission of STATUS PDU between a base station control apparatus and a mobile station in accordance with embodiment 6 of the present invention.

FIG. 22 is a diagram showing a flow of transmission of STATUS PDU exchanged between radio link control unit of a base station control apparatus 104 and those of a mobile station 102 in accordance with embodiment 6.

STATUS PDU for use in between radio link control units (RLC) which comply with the conventional standards is transmitted by a receive side (Receiver) which receives data (RLC PDU), i.e., a base station side in the uplink. In accordance with embodiment 6, a transmit side (Sender) which transmits data, i.e., the mobile station transmits data to the base station (Receiver) to notify the status of the mobile station (Sender) to the base station.

Report information from a MAC-e unit 605 (TRbuffer) is notified from a media access control unit 203 to the radio link control unit 202 using control information (MACcont and RLCcont), and is then notified to the base station 103 via the base station control apparatus 104 as communication information data transmitted between the radio link control units 202.

Because the transmission-and-reception operation of the mobile station is the same as that of the flow shown in FIG. 21 in which the process done via the radio resource control unit (RRC) is omitted, the detailed explanation of the transmission-and-reception operation will be omitted.

Figure 23:
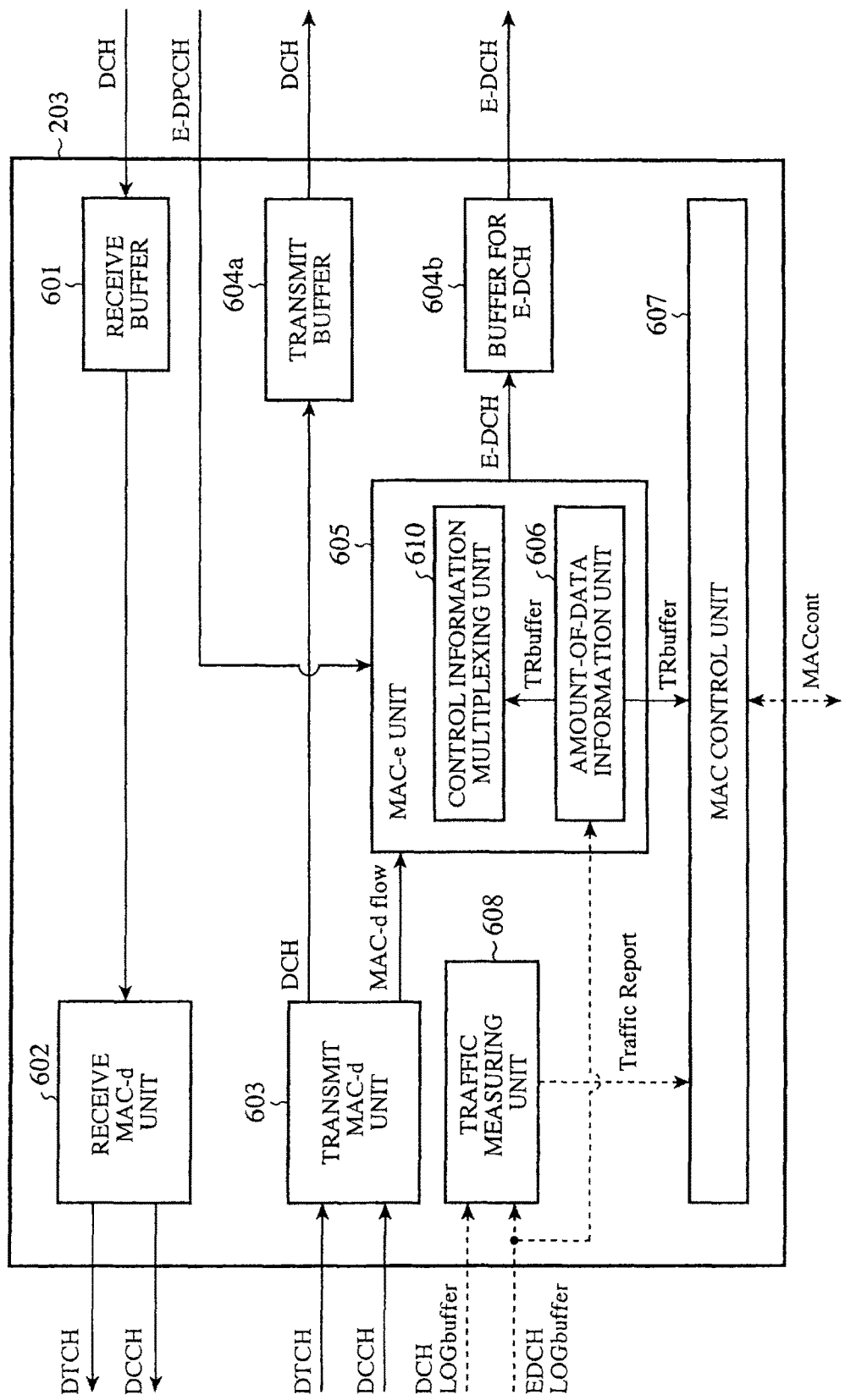
FIG. 23 is a block diagram showing the structure of a media access control unit of the mobile station in accordance with embodiment 6 of the present invention.

FIG. 23 is a block diagram showing the structure of the media access control unit 203 of the mobile station in accordance with embodiment 6. The media access control unit 203 of this embodiment differs from the media access control unit 203 of the mobile station 102 of embodiment 1 in that the report information (TRbuffer) is also outputted from the MAC-e unit 605 to a MAC control unit 607.

The report information (TRbuffer) inputted to the MAC control unit 607 is outputted from the MAC control unit 607 to a radio resource control unit 206 as control information (MACcont), and is further transferred to the radio link control unit 202. Next, in the radio link control unit 202, it becomes DCCH data, and is notified from the mobile station 102 to the base station control apparatus 104 via the base station 103. The radio link control unit 1202 of the base station control apparatus 104 decodes the STATUS PDU, and notifies it to the base station 103 using NBAP signaling. The method of NBAP signaling is not limited to a specific one. Because the method of transmitting data from the mobile station 102 to the base station 103 is the same as that of the flow shown in FIG. 21, the detailed explanation of the method will be omitted.

In this embodiment 6, the report information (TRbuffer) can be divided into two kinds of information. For example, one of them can be transmitted and received via the radio link control unit at long-time intervals, and the other one can be transmitted and received at short-time intervals with MAC-e PDU. As an alternative, the absolute value of the report information (TRbuffer) which is one of them can be transmitted and received via the radio link control unit, and increase or decrease information (Up/Down) which is the other one can be transmitted and received at short-time intervals with MAC-e PDU. Into what kinds of information the report information (TRbuffer) is divided is not limited to this example. When the report information (TRbuffer) is transmitted to the base station 103 via communications between the radio link control units, either of STATUS PDU and piggyback PDU can be used.

When transferring the report information to the base station control apparatus 104 via the base station 103, the base station 103 can decode the description of the report information independently.

As mentioned above, because the mobile station 102 can temporarily transfer the report information to the radio link control unit, and can notify the absolute value of the report information (TRbuffer) to the base station 103 via communications between the radio link control units, synchronization between the report information value of the mobile station 102 and that of the base station 103 can be achieved and therefore occurrence of packet transmission errors due to inconsistency in setups can be prevented. Because the length of MAC-e PDU can be shortened by transmitting only the increase or decrease information with MAC-e PDU, the overhead can be reduced.

Because packet data is produced bursty and the base station 103 can grasp the amount of packet data received thereby, the transmission frequency can be reduced by transmitting the report information only when each burst of packet data is produced. As a result, the occurrence of uplink interference can be suppressed, and the resource can be assigned to other mobile stations 102.

Furthermore, because an absolute value having a large bit number does not need to be notified at a high frequency with MAC-e PDU, the overhead of MAC-e PDU can be reduced and therefore the occurrence of uplink interference can be reduced.

INDUSTRIAL APPLICABILITY

As mentioned above, the mobile station in accordance with the present invention is suitable for a notification of transmission data information about the mobile station which is needed for radio resource control for uplink by the base station directly to the base station at a high speed.

The invention claimed is:
1. A mobile station comprising:
    a radio link controller that outputs or inputs data that is transmitted to or received from a base station via a radio channel to or from a higher-level protocol layer;
    a media access controller that outputs or inputs said data via a logical channel to or from said radio link controller; and
    a radio resource controller that controls the radio link controller and the media access controller, wherein
    the media access controller multiplexes report information to be transmitted to the base station into a channel for packet data transmission and transmits the report information to the base station, and
    wherein the media access controller transmits to the base station, data amount information to the base station together with information indicating presence or absence of the data amount information by multiplexing on said channel for packet data transmission.
2. The mobile station according to claim 1, wherein the report information from said mobile station is placed in a header of data in a data format which is to be transmitted via the channel for packet data transmission.
3. The mobile station according to claim 1, wherein the report information from said mobile station is placed in a tail end of data in a data format which is to be transmitted via the channel for packet data transmission.
4. The mobile station according to claim 1, wherein data to be transmitted via said channel for packet data transmission has a data format having an information area indicating a type of the report information from said mobile station.
5. The mobile station according to claim 1, wherein data to be transmitted via said channel for packet data transmission has a data format having an information area indicating presence or absence of packet data.
6. The mobile station according to claim 1, wherein data to be transmitted via said channel for packet data transmission has a data format intended for transmitting the report information from said mobile station.
7. The mobile station according to claim 6, wherein said intended format is added to a data format of data to be transmitted via said channel for packet data transmission, and data is transmitted to the base station in this data format.
8. The mobile station according to claim 1, further comprising:
    a retransmission controller that is utilized for said channel for packet data transmission, wherein
    the report information from said mobile station is multiplexed to a data format of data to be transmitted via the channel for packet data transmission according to the retransmission control cycle.
9. The mobile station according to claim 1, wherein a part of the report information is separated and is notified to a base station control apparatus.
10. A base station comprising:
    a radio link controller that outputs or inputs data that is transmitted to or received from a mobile station via a radio channel to or from a higher-level protocol layer;
    a media access controller that outputs or inputs said data via a logical channel to or from said radio link control unit; and
    a radio resource controller that controls the radio link controller and the media access controller, wherein
    the media access controller carries out assignment of radio resources by using report information which has been multiplexed into data transmitted via a channel for packet data transmission from said mobile station, and
    wherein the base station receives from the mobile station, data amount information together with information indicating presence or absence of the data amount information which has been multiplexed on said channel for packet data transmission.

11. A communications system comprising:
a base station; and
a mobile station that includes
 a radio link controller that outputs or inputs data that is transmitted or received via a radio channel to or from a higher-level protocol layer,
 a media access controller that outputs or inputs said data via a logical channel to or from said radio link controller, and
 a radio resource controller that controls the radio link controller and the media access controller, wherein
said mobile station multiplexes report information into a channel for packet data transmission and transmits the report information to the base station, and
said base station carries out assignment of radio resources by using the report information transmitted from said mobile station,
wherein the media access controller transmits to the base station, data amount information to the base station together with information indicating presence or absence of the data amount information by multiplexing on said channel for packet data transmission.

12. A communications method comprising:
multiplexing, by a mobile station, report information into a channel for packet data transmission and transmitting the report information to a base station, said mobile station including a radio link controller that outputs or inputs data that is transmitted to or received from said base station via a radio channel to or from a higher-level protocol layer, a media access controller that outputs or inputs said data via a logical channel to or from said radio link controller, and a radio resource controller that controls the radio link controller and the media access controller; and
carrying out, by said base station, assignment of radio resources by using the report information transmitted from said mobile station,
wherein the media access controller transmits to the base station, data amount information to the base station together with information indicating presence or absence of the data amount information by multiplexing on said channel for packet data transmission.

* * * * *